United States Patent
Kim et al.

(10) Patent No.: US 11,417,323 B2
(45) Date of Patent: Aug. 16, 2022

(54) ELECTRONIC APPARATUS AND CONTROL METHOD THEREOF

(71) Applicant: Samsung Electronics Co., Ltd., Suwon-si (KR)

(72) Inventors: Jeongsu Kim, Suwon-si (KR); Changwoo Han, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 220 days.

(21) Appl. No.: 16/749,350

(22) Filed: Jan. 22, 2020

(65) Prior Publication Data

US 2020/0273451 A1 Aug. 27, 2020

(30) Foreign Application Priority Data

Feb. 27, 2019 (KR) .................. 10-2019-0023234
Aug. 19, 2019 (KR) .................. 10-2019-0101234

(51) Int. Cl.
*G10L 15/197* (2013.01)
*G10L 15/22* (2006.01)
(Continued)

(52) U.S. Cl.
CPC ............ *G10L 15/197* (2013.01); *G06N 20/00* (2019.01); *G10L 15/22* (2013.01); *G10L 25/60* (2013.01);
(Continued)

(58) Field of Classification Search
CPC .............. G10L 15/16; G10L 15/1815; G10L 2015/223; G10L 15/197; G10L 15/22; G10L 25/60; G10L 25/84; G06N 20/00
See application file for complete search history.

(56) References Cited

U.S. PATENT DOCUMENTS 10,026,399 B2   7/2018 Gopalan et al.
10,685,652 B1 * 6/2020 Cherukuri ............... G10L 15/22
(Continued)

FOREIGN PATENT DOCUMENTS

JP         2016-033578 A    3/2016
KR   10-2014-0046654 A    4/2014
(Continued)

OTHER PUBLICATIONS

International Search Report with Written Opinion dated May 13, 2020; International Appln. No. PCT/KR2020/001101.
(Continued)

*Primary Examiner* — Daniel C Washburn
*Assistant Examiner* — Athar N Pasha
(74) *Attorney, Agent, or Firm* — Jefferson IP Law, LLP

(57) ABSTRACT

An electronic device is provided. The electronic apparatus includes a communication interface, and at least one processor configured to receive a first audio signal and a second audio signal from a first sensor device, and a second sensor device located away from the first sensor device, respectively, through the communication interface, acquire similarity between the first audio signal and the second audio signal, acquire a first predicted audio component from the first audio signal based on an operation state of an electronic apparatus located adjacent to the first sensor device, and a second predicted audio component from the second audio signal based on an operation state of an electronic apparatus located adjacent to the second sensor device in the case where the similarity is equal to or higher than a threshold value, identify one of the first sensor device or the second sensor device as an effective sensor device based on the first predicted audio component and the second predicted audio component, and perform speech recognition with respect to
(Continued)

an additional audio signal received from the effective sensor device.

20 Claims, 21 Drawing Sheets

(51) Int. Cl.
  *G10L 25/84* (2013.01)
  *G06N 20/00* (2019.01)
  *G10L 25/60* (2013.01)
(52) U.S. Cl.
  CPC ........ *G10L 25/84* (2013.01); *G10L 2015/223* (2013.01)

(56) References Cited

U.S. PATENT DOCUMENTS

| | | | |
|---|---|---|---|
| 10,909,582 B1* | 2/2021 | Brandt | G06Q 30/0279 |
| 2016/0314782 A1 | 10/2016 | Klimanis | |
| 2017/0103755 A1 | 4/2017 | Jeon et al. | |
| 2017/0345422 A1* | 11/2017 | Yang | G10L 15/22 |
| 2017/0357478 A1 | 12/2017 | Piersol et al. | |
| 2018/0005511 A1* | 1/2018 | Herrala | G08B 25/008 |
| 2018/0182390 A1 | 6/2018 | Hughes et al. | |
| 2018/0197533 A1 | 7/2018 | Lyon et al. | |
| 2018/0277107 A1 | 9/2018 | Kim | |
| 2018/0286407 A1* | 10/2018 | Katoh | G10L 15/083 |
| 2018/0293367 A1* | 10/2018 | Urman | H04W 4/70 |
| 2018/0342244 A1* | 11/2018 | Thomsen | G10L 15/32 |
| 2019/0173663 A1* | 6/2019 | Zhu | H04N 21/4392 |
| 2020/0227050 A1* | 7/2020 | Greenstein | H04L 12/282 |

FOREIGN PATENT DOCUMENTS

| | | |
|---|---|---|
| KR | 10-2015-0103586 A | 9/2015 |
| KR | 10-2017-0043055 A | 4/2017 |
| KR | 10-2017-0135133 A | 12/2017 |
| KR | 10-2018-0130316 A | 12/2018 |

OTHER PUBLICATIONS

Extended European Search Report dated Dec. 7, 2021, issued in European Patent Application No. 20763564.0.

* cited by examiner

| DEVICE | MODE 1 | MODE 2 | MODE 3 |
|---|---|---|---|
| TV | 60 (ON) | 30(vol down) | 60 (ON) |
| REFRIGERATOR | 20 (ON) | 20 (ON) | 20 (ON) |
| AIR CONDITIONER | 30 (TURBO) | 20(NORMAL) | 10 (OFF) |

FIG. 5

|       | SPEECH + NOISE                                    | NOISE REDUCTION                                             |          |
|-------|---------------------------------------------------|-------------------------------------------------------------|----------|
| Dot 1 | Hi Bixby<br>SPEECH SIGNAL : 65<br>Noise : 60      | Hi Bixby<br>SPEECH SIGNAL : 65<br>Expected Noise : 30       | Selected |
| Dot 2 | Hi Bixby<br>SPEECH SIGNAL : 30<br>Noise : 20      | Hi Bixby<br>SPEECH SIGNAL : 30<br>Expected Noise : 20       | Discard  |
| Dot 3 | Hi Bixby<br>SPEECH SIGNAL : 40<br>Noise : 30      | Hi Bixby<br>SPEECH SIGNAL : 40<br>Expected Noise : 20       | Discard  |
| Dot 4 | -                                                 | -                                                           | -        |

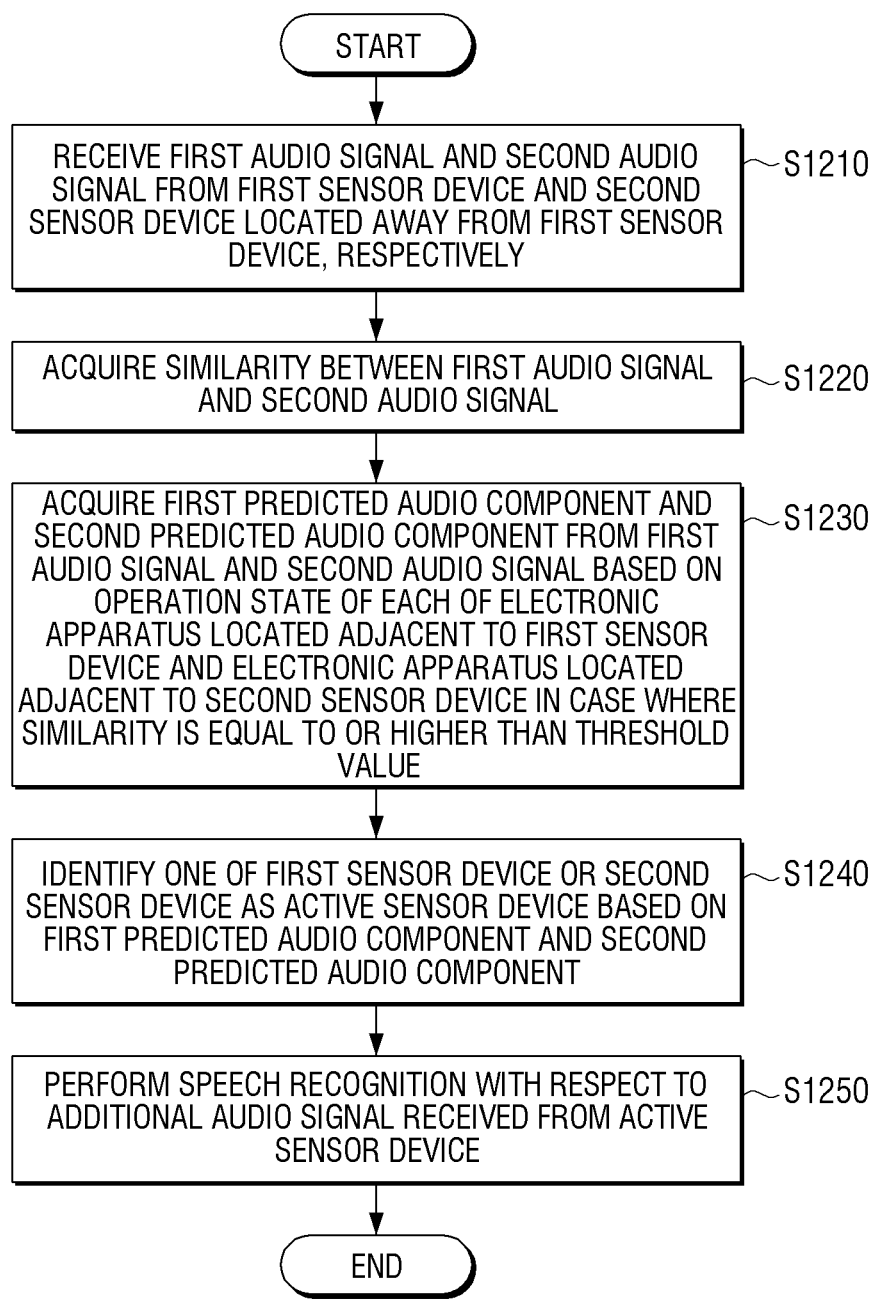

ELECTRONIC APPARATUS AND CONTROL METHOD THEREOF

CROSS-REFERENCE TO RELATED APPLICATION(S)

This application is based on and claims priority under 35 U.S.C. § 119(a) of a Korean patent application number 10-2019-0023234, filed on Feb. 27, 2019, and of a Korean patent application number 10-2019-0101234, filed on Aug. 19, 2019 in the Korean Intellectual Property Office, the disclosures of which are incorporated by reference herein in its entirety.

BACKGROUND

1. Field

The disclosure relates to an electronic apparatus and a control method thereof. More particularly, the disclosure relates to an electronic apparatus performing speech recognition, and a control method thereof.

The disclosure also relates to an artificial intelligence (AI) system simulating a recognition function and a decision function of a human brain using a machine learning algorithm, and an application thereof.

2. Description of Related Art

Recently, an artificial intelligence system implementing human-level intelligence has been used in various fields. The artificial intelligence system is a system in which a machine performs learning and decision making functions and becomes smart by itself unlike an existing rule-based smart system. As the artificial intelligence system is used more and more, a recognition rate is improved and a user's taste may be more accurately understood, such that the existing rule-based smart system has been gradually replaced by a deep learning-based artificial intelligence system.

An artificial intelligence technology is constituted by machine learning (for example, deep learning) and element technologies using the machine learning.

The machine learning is an algorithm technology of classifying/learning features of input data by itself, and the element technology is a technology of simulating functions of a human brain, such as recognition, decision, and the like using a machine learning algorithm such as deep learning, or the like, and is constituted by technical fields such as linguistic understanding, visual understanding, inference/prediction, knowledge representation, a motion control, and the like.

Various fields to which the artificial intelligence technology is applied are as follows. The linguistic understanding is a technology of recognizing and applying/processing human languages, and includes natural language processing, machine translation, a dialogue system, question and answer, speech recognition/synthesis, and the like. The visual understanding is a technology of recognizing and processing things like human vision, and includes object recognition, object tracking, image search, human recognition, scene understanding, space understanding, image improvement, and the like. The inference/prediction is a technology of evaluating information for logical inference and prediction, and includes knowledge/probability-based inference, optimization prediction, preference-based planning, recommendation, and the like. The knowledge representation is a technology in which human experience information is represented in a form of knowledge data, and includes knowledge construction (data generation/classification), knowledge management (data utilization), and the like. The motion control is a technology of controlling self-driving of a vehicle and a motion of a robot, and includes a movement control (navigation, collision, and driving), a manipulation control (behavior control), and the like.

Recently, electronic apparatuses that recognize user speech and are operated according to the recognized user speech, such as an AI speaker, have been developed. However, placement of the electronic apparatuses in all spaces such as a living room, a kitchen, and a bedroom may be problematic in terms of costs.

Due to such a problem, a method of using one main (Edge) apparatus processing user speech and a plurality of sub (Dot) apparatuses receiving the user speech and providing the user speech to the main apparatus has been developed. The plurality of sub apparatuses may be placed in spaces such as a living room, a kitchen, and a bedroom.

In this case, however, user speech may be input through several sub apparatuses, which may cause a problem that processing of the same requirement is duplicated. Moreover, network transmission and calculation resources may be wasted due to the duplication.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Also, the disclosure is not required to overcome the disadvantages described above, and an embodiment of the disclosure may not overcome any of the problems described above.

Accordingly, an aspect of the disclosure is to provide an electronic apparatus setting priority for a plurality of sensor devices, and a control method thereof.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a communication interface, and at least one processor configured to receive a first audio signal and a second audio signal from a first sensor device, and a second sensor device located away from the first sensor device, respectively, through the communication interface, acquire similarity between the first audio signal and the second audio signal, acquire a first predicted audio component from the first audio signal based on an operation state of an electronic apparatus located adjacent to the first sensor device, and a second predicted audio component from the second audio signal based on an operation state of an electronic apparatus located adjacent to the second sensor device in a case in which the similarity is equal to or higher than a threshold value, identify one of the first sensor device or the second sensor device as an effective sensor device based on the first predicted audio component and the second predicted audio component, and perform speech recognition with respect to an additional audio signal received from the effective sensor device.

The electronic apparatus may further include a memory in which a mode-specific audio model based on an operation state of each of the electronic apparatus and at least one other electronic apparatus is stored, wherein the at least processor is further configured to identify a mode corresponding to the operation state of the electronic apparatus located adjacent to the first sensor device and the operation state of the electronic apparatus located adjacent to the second sensor device based on the audio model, and acquire the first predicted audio component and the second predicted audio component from the first audio signal and the second audio signal, respectively, based on the identified mode, and the audio model may be acquired, as each of a plurality of sensor devices learns audio acquired based on an operation state of an adjacent electronic apparatus, through an artificial intelligence algorithm.

The at least processor may be further configured to acquire the first predicted audio component and the second predicted audio component from a noise component included in the first audio signal and a noise component included in the second audio signal, respectively, based on the identified mode, acquire a first quality characteristic of the first audio signal and a second quality characteristic of the second audio signal based on a magnitude of the first predicted audio component and a magnitude of the second predicted audio component, respectively, and identify one of the first sensor device or the second sensor device as the effective sensor device based on the first quality characteristic and the second quality characteristic.

The at least processor may be further configured to change the operation state of the electronic apparatus located adjacent to the first sensor device and the operation state of the electronic apparatus located adjacent to the second sensor device to allow the electronic apparatus located adjacent to the first sensor device and the electronic apparatus located adjacent to the second sensor device to be operated in a predetermined mode according to a predetermined event.

The at least processor may be further configured to control at least one of the electronic apparatus or the at least one other electronic apparatus based on a speech recognition result, and control the effective sensor device to provide a notification message notifying a control result.

The at least processor may be further configured to acquire the similarity in a case in which the second audio signal is received within a threshold time from when the first audio signal is received.

The at least processor may be further configured to identify the first sensor device and the second sensor device as a first effective sensor device and a second effective sensor device, respectively, in a case in which the second audio signal is received after a threshold time from when the first audio signal is received, or in a case in which the similarity is lower than the threshold value, and perform speech recognition with respect to an additional audio signal received from each of the first effective sensor device and the second effective sensor device.

The at least processor may be further configured to acquire time domain similarity between the first audio signal and the second audio signal, acquire frequency domain similarity between the first audio signal and the second audio signal, and acquire the similarity based on at least one of the time domain similarity or the frequency domain similarity.

The at least processor may be further configured to ignore, based on one of the first sensor device or the second sensor device being identified as the effective sensor device, an additional audio signal received from the other one of the first sensor device or the second sensor device within a threshold time from when the effective sensor device is identified.

In accordance with another embodiment of the disclosure, a control method of an electronic apparatus is provided. The control method of the electronic includes receiving a first audio signal and a second audio signal from a first sensor device, and a second sensor device located away from the first sensor device, respectively, through the communication interface, acquiring similarity between the first audio signal and the second audio signal, acquiring a first predicted audio component from the first audio signal based on an operation state of an electronic apparatus located adjacent to the first sensor device, and a second predicted audio component from the second audio signal based on an operation state of an electronic apparatus located adjacent to the second sensor device in a case in which the similarity is equal to or higher than a threshold value, identifying one of the first sensor device or the second sensor device as an effective sensor device based on the first predicted audio component and the second predicted audio component, and performing speech recognition with respect to an additional audio signal received from the effective sensor device.

The acquiring of the first predicted audio component and the second predicted audio component may include identifying a mode corresponding to the operation state of the electronic apparatus located adjacent to the first sensor device and the operation state of the electronic apparatus located adjacent to the second sensor device based on a mode-specific audio model based on an operation state of each of the electronic apparatus and at least one electronic apparatus, and acquiring the first predicted audio component and the second predicted audio component from the first audio signal and the second audio signal, respectively, based on the identified mode, and the audio model may be acquired, as each of a plurality of sensor devices learns audio acquired based on an operation state of an adjacent electronic apparatus, through an artificial intelligence algorithm.

The acquiring of the first predicted audio component and the second predicted audio component based on the identified mode may include acquiring the first predicted audio component and the second predicted audio component from a noise component included in the first audio signal and a noise component included in the second audio signal, respectively, based on the identified mode, and acquiring a first quality characteristic of the first audio signal and a second quality characteristic of the second audio signal based on a magnitude of the first predicted audio component and a magnitude of the second predicted audio component, respectively, and in the identifying as the effective sensor device, one of the first sensor device or the second sensor device may be identified as the effective sensor device based on the first quality characteristic and the second quality characteristic.

The control method may further include changing the operation state of the electronic apparatus located adjacent to the first sensor device and the operation state of the electronic apparatus located adjacent to the second sensor device to allow the electronic apparatus located adjacent to the first sensor device and the electronic apparatus located adjacent to the second sensor device to be operated in a predetermined mode according to a predetermined event.

The control method may further include controlling at least one of the electronic apparatus or at least one other electronic apparatus based on a speech recognition result, and controlling the effective sensor device to provide a notification message notifying a control result.

In the acquiring of the similarity, the similarity may be acquired in a case in which the second audio signal is received within a threshold time from when the first audio signal is received.

The control method may further include identifying the first sensor device and the second sensor device as a first effective sensor device and a second effective sensor device, respectively, in a case in which the second audio signal is received after a threshold time from when the first audio signal is received, or in a case in which the similarity is lower than the threshold value, and performing speech recognition with respect to an additional audio signal received from each of the first effective sensor device and the second effective sensor device.

The acquiring of the similarity may include acquiring time domain similarity between the first audio signal and the second audio signal, acquiring frequency domain similarity between the first audio signal and the second audio signal, and acquiring the similarity based on at least one of the time domain similarity or the frequency domain similarity.

The control method may further include ignoring, based on one of the first sensor device or the second sensor device being identified as the effective sensor device, an additional audio signal received from the other one of the first sensor device or the second sensor device within a threshold time from when the effective sensor device is identified.

In accordance with another embodiment of the disclosure, an electronic apparatus is provided. The apparatus includes a microphone, a communication interface, and at least one processor configured to receive a first audio signal through the microphone, receive a second audio signal from a sensor device through the communication interface, acquire similarity between the first audio signal and the second audio signal, acquire a first predicted audio component and a second predicted audio component from the first audio signal and the second audio signal, respectively, based on an operation state of each of the electronic apparatus, and an electronic apparatus located adjacent to the sensor device in a case in which the similarity is equal to or higher than a threshold value, identify one of the electronic apparatus or the sensor device as an effective device based on the first predicted audio component and the second predicted audio component, and perform speech recognition with respect to an additional audio signal received from the effective device.

In accordance with the various embodiments of the disclosure described above, the electronic apparatus may prioritize one of a plurality of sensor devices to prevent problems such as duplication of processing, and a waste of resources.

Other aspects, advantages and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is a diagram for describing a speech recognition method according to the embodiment of the disclosure;

FIG. 5 is a diagram for describing a speech recognition method according to the embodiment of the disclosure;

FIG. 12 is a flowchart for describing a control method of an electronic apparatus according to an embodiment of the disclosure.

Throughout the drawings, like reference numerals will be understood to refer to like parts, components, and structures.

DETAILED DESCRIPTION

Figure 1:
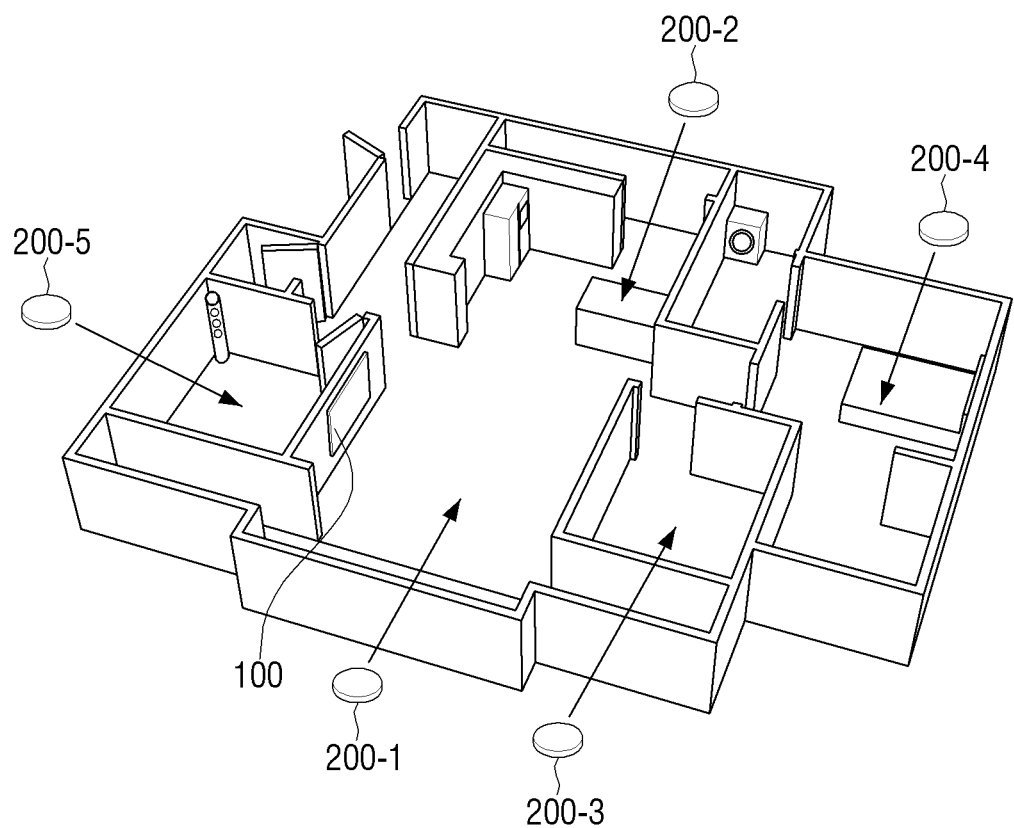
FIG. 1 is a view illustrating an electronic system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure should be defined based on the meaning of the terms and the contents throughout the disclosure rather than simple names of the terms.

In the specification, an expression "have", "may have", "include", "may include", or the like, indicates existence of a corresponding feature (for example, a numerical value, a function, an operation, or a component such as a part), and does not exclude existence of an additional feature.

An expression "at least one of A or/and B" should be understood as indicating "A or B", or "A and B".

Expressions "first", "second", or the like, used in the specification may indicate various components regardless of a sequence and/or importance of the components, will be used only in order to distinguish one component from the other components, and do not limit the corresponding components.

When it is mentioned that any component (for example, a first component) is (operatively or communicatively) coupled with/to or is connected to another component (for example, a second component), it is to be understood that any component is directly coupled to another component or may be coupled to another component through the other component (for example, a third component).

Singular forms are intended to include plural forms unless the context clearly indicates otherwise. It will be further understood that terms "include" or "formed of" used in the specification specify the presence of features, numerals, operations, components, parts, or combinations thereof mentioned in the specification, but do not preclude the presence or addition of one or more other features, numerals, operations, components, parts, or combinations thereof.

In the disclosure, a "module"' or a "-er/or" may perform at least one function or operation, and be implemented by hardware or software or be implemented by a combination of hardware and software. In addition, a plurality of "modules" or a plurality of "-ers/ors" may be integrated in at least one module and be implemented by at least one processor (not illustrated) except for a "module" or a "-er/or" that needs to be implemented by specific hardware.

In the disclosure, a term "user" may be a person that uses an electronic apparatus or an apparatus (for example, artificial intelligence (AI) electronic apparatus) that uses an electronic apparatus.

Hereinafter, an embodiment of the disclosure will be described in detail with reference to the accompanying drawings.

FIG. 1 is a view illustrating an electronic system according to an embodiment of the disclosure.

Referring to FIG. 1, an electronic system 1000 includes an electronic apparatus 100 and a plurality of sensor devices 200-1, 200-2, 200-3, 200-4, and 200-5. Here, the electronic apparatus 100 may be referred to as an edge apparatus, an edge computing apparatus, or a hub apparatus, and the sensor device (e.g., any of 200-1 to 200-5) may be referred to as a dot device.

The electronic apparatus 100 according to various embodiments in the specification may include at least one of, for example, a speaker, a smartphone, a tablet personal computer (PC), a mobile phone, an image phone, an e-book reader, a desktop PC, a laptop PC, a netbook computer, a workstation, a server, a personal digital assistant (PDA), a portable multimedia player (PMP), an MP3 player, a medical device, a camera, or a wearable device. The wearable device may include at least one of an accessory type wearable device (for example, a watch, a ring, a bracelet, an anklet, a necklace, a glasses, a contact lens, or a head-mounted-device (HMD)), a textile or clothing integral type wearable device (for example, an electronic clothing), a body attachment type wearable device (for example, a skin pad or a tattoo), or a living body implantable circuit. According to embodiments, the electronic apparatus 100 may include at least one of, for example, a television (TV), a digital versatile disk (DVD) player, an audio player, a refrigerator, an air conditioner, a vacuum cleaner, an oven, a microwave oven, a washing machine, an air cleaner, a set-top box, a home automation control panel, a security control panel, a media box (for example, Samsung HomeSync™, Apple TV™, or Google TV™), a game console (for example, Xbox™ or PlayStation™), an electronic dictionary, an electronic key, a camcorder, or a digital photo frame.

According to other embodiments, the electronic apparatus 100 may include at least one of various medical devices (for example, various portable medical measuring devices (such as a blood glucose meter, a heart rate meter, a blood pressure meter, and a body temperature meter), a magnetic resonance angiography (MRA), a magnetic resonance imaging (MRI), a computed tomography (CT), a photographing device, and an ultrasonic device), a navigation device, a global navigation satellite system (GNSS), an event data recorder (EDR), a flight data recorder (FDR), an automobile infotainment device, marine electronic equipment (for example, a marine navigation device or a gyro compass), avionics, a security device, an automobile head unit, an industrial or household robot, a drone, an automatic teller's machine (ATM) of a financial institute, a point of sales (POS) of a shop, or Internet of things (IoT) devices (for example, a light bulb, various sensors, a sprinkler system, a fire alarm, a thermostat, a street light, a toaster, exercise equipment, a hot water tank, a heater, and a boiler).

Although FIG. 1 illustrates the case where the electronic apparatus 100 is a TV for convenience of explanation, the electronic apparatus 100 may be a device other than a TV. For example, one of a refrigerator, a washing machine, or a speaker may be operated as the electronic apparatus 100.

Alternatively, a plurality of home appliances may be operated as the electronic apparatuses 100. For example, a TV may be operated as a first electronic apparatus, a refrigerator may be operated as a second electronic apparatus, and the first and second electronic apparatuses may be operated cooperatively with each other or operated individually. A description thereof will be provided below.

The electronic apparatus 100 may receive an audio signal from at least one of the plurality of sensor devices 200-1 to 200-5. For example, the electronic apparatus 100 may receive an audio signal corresponding to an utterance "lower the temperature of the refrigerator", and in this case, the electronic apparatus 100 may transmit, to a refrigerator, a control instruction for lowering a temperature of the refrigerator. Here, the plurality of sensor devices 200-1 to 200-5 may be devices each receiving ambient audio and each transmitting an audio signal to the electronic apparatus 100.

The electronic apparatus 100 may receive a first audio signal from a first sensor device 200-1 and receive a second audio signal from a second sensor device 200-2 among the plurality of sensor devices 200-1 to 200-5, and may acquire similarity (i.e., determine a similarity) between the first audio signal and the second audio signal. Here, a point in time at which the first audio signal is received may be substantially the same as a point in time at which the second audio signal is received.

For example, in the case where the user utters "Hi Bixby" in a living room, the electronic apparatus 100 may receive the first audio signal corresponding to "Hi Bixby" from the first sensor device 200-1 placed in the living room. Further, the utterance of the user may also be input to the second sensor device 200-2 placed in a kitchen, and the electronic apparatus 100 may receive the second audio signal corresponding to "Hi Bixby" from the second sensor device 200-2 placed in the kitchen. The second sensor device 200-2 is located further away from the electronic apparatus 100 than the first sensor device 200-1, and thus a point in time at which the electronic apparatus 100 receives the second audio signal may be later than a point in time at which the electronic apparatus 100 receives the first audio signal.

In the case where the similarity is equal to or higher than a threshold value, the electronic apparatus 100 may identify one of the first sensor device 200-1 or the second sensor device 200-2 as an effective sensor device based on the first audio signal and the second audio signal, and perform speech recognition with respect to an additional audio signal received from the effective sensor device.

As an example, in the case where it is determined that the first audio signal and the second audio signal result from the same utterance, the electronic apparatus 100 may identify only one of the first sensor device 200-1 or the second sensor device 200-2 as the effective sensor device. At this time, the electronic apparatus 100 may transmit, to a sensor device identified as the effective sensor device, a signal notifying that the sensor device is the effective sensor device, and the sensor device may provide an alarm based on the received signal. For example, once the signal notifying that the sensor device is the effective sensor device is received, the sensor device may notify the user that the sensor device is in a speech recognition activation state, through light emitting diode (LED) notification, sound notification, or the like.

The electronic apparatus 100 may identify only one of the first sensor device 200-1 or the second sensor device 200-2 as the effective sensor device based on a quality characteristic of each of the first audio signal and the second audio signal. Here, the quality characteristic of the audio signal may include at least one of intensity, power, or a signal-to-noise ratio (SNR) characteristic of the audio signal.

The electronic apparatus 100 may not perform speech recognition even if an additional audio signal is received from a sensor device that is not identified as the effective sensor device.

The electronic system 1000 may further include at least one other electronic apparatus (not illustrated). Here, the other electronic apparatus is an apparatus controlled by the electronic apparatus 100, and may perform communication with the electronic apparatus 100. In addition, the other electronic apparatus may also perform some of operations of the electronic apparatus 100 in some cases. Hereinafter, the case where the electronic system 1000 includes only the first sensor device 200-1 and the second sensor device 200-2 will be described for convenience of explanation.

Each of the plurality of sensor devices 200-1 to 200-5 may be disposed within a predetermined distance from the other electronic apparatus. However, the disclosure is not limited thereto, and the sensor device may also be disposed at a location at which the electronic apparatus or the other electronic apparatus is not present within a predetermined distance.

Each of the plurality of sensor devices 200-1 to 200-5 may receive user speech or other sounds. Further, each of the plurality of sensor devices 200-1 to 200-5 may convert the input user speech or the like into an audio signal and transmit the audio signal to the electronic apparatus 100.

Alternatively, each of the plurality of sensor devices 200-1 to 200-5 may wake up once user speech including a trigger word or a wake-up word is received, and may transmit, to the electronic apparatus 100, an audio signal corresponding to user speech received after waking up. For example, each of the plurality of sensor devices 200-1 to 200-5 may wake up once a trigger word is received, and may transmit, to the electronic apparatus 100, an audio signal corresponding to user speech received after waking up. As an example, each of the plurality of sensor devices 200-1 to 200-5 may be operated in a standby mode to significantly reduce power consumption and prevent an unnecessary audio signal from being transmitted to the electronic apparatus 100.

However, the disclosure is not limited thereto, and each of the plurality of sensor devices 200-1 to 200-5 may wake up, for example, once the user is detected, and may transmit, to the electronic apparatus 100, an audio signal corresponding to user speech input after the user is detected. For example, each of the plurality of sensor devices 200-1 to 200-5 may include a motion sensor to wake up once a user's motion is detected, and may transmit, to the electronic apparatus 100, an audio signal corresponding to user speech input after waking up. Alternatively, each of the plurality of sensor devices 200-1 to 200-5 may include an illuminance sensor to wake up once a user's touch is detected, and may transmit, to the electronic apparatus 100, an audio signal corresponding to user speech input after waking up. Alternatively, each of the plurality of sensor devices 200-1 to 200-5 may include an infrared sensor, a heat sensor, a sound sensor, or the like to detect the user, and may transmit, to the electronic apparatus 100, an audio signal corresponding to user speech input after the user is detected.

Each of the plurality of sensor devices 200-1 to 200-5 may detect user speech through at least one of voice activity detection (VAD) or end point detection (EPD). The VAD and the EPD are technologies commonly used in a speech recognition field to detect user speech by using a statistical model, a deep-learning model, and the like, based on a volume of speech, energy distribution in a frequency domain, or the like.

Each of the plurality of sensor devices 200-1 to 200-5 may transmit, to the electronic apparatus 100, at least one of time information indicating speech activity of user speech that is acquired through the VAD, or time information indicating the end points of user speech that is acquired through the EPD, in addition to an audio signal corresponding to input user speech. For example, the sensor device 200-1 may transmit, to the electronic apparatus 100, an audio signal corresponding to user speech, and time information (AM 9:00:00 and AM 9:00:03) indicating the end points of the user speech.

Once at least one of time information indicating speech activity of each of first user speech and second user speech, or time information indicating the end points of user speech is received from the first sensor device 200-1 and the second sensor device 200-2, the electronic apparatus 100 may acquire similarity between a first audio signal corresponding to the first user speech and a second audio signal corresponding to the second user speech based on the received information.

For example, the electronic apparatus 100 may receive the first audio signal corresponding to the first user speech, and time information (AM 9:00:00 and AM 9:00:03) indicating the end points of the first user speech from the first sensor device 200-1, and receive the second audio signal corresponding to the second user speech, and time information (AM 9:00:01 and AM 9:00:04) indicating the end points of the second user speech from the second sensor device 200-2. Further, the electronic apparatus 100 may determine that the first audio signal and the second audio signal result from the same user speech because a time difference between the end points of the first user speech and a time difference between the end points of the second user speech are the same as each other.

However, the disclosure is not limited thereto, and each of the plurality of sensor devices 200-1 to 200-5 may transmit only an audio signal corresponding to input user speech to the electronic apparatus 100. In this case, the electronic apparatus 100 may acquire time information indicating speech activity of user speech through the VAD, and acquire time information indicating the end points of the user speech through the EPD.

Figure 2A:
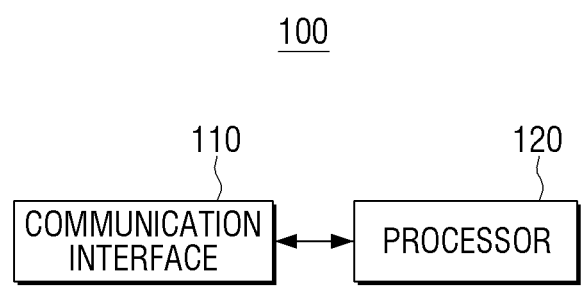
FIG. 2A is a block diagram illustrating an example of a configuration of an electronic apparatus according to an embodiment of the disclosure.

FIG. 2A is a block diagram illustrating an example of a configuration of an electronic apparatus according to an embodiment of the disclosure.

Referring to FIG. 2A, the electronic apparatus 100 includes a communication interface 110 and a processor 120.

The communication interface 110 is a component for performing communication with various apparatuses. For example, the communication interface 110 may be implemented by various communication interfaces such as Bluetooth (BT), Bluetooth low energy (BLE), wireless fidelity (Wi-Fi), and Zigbee. However, the disclosure is not limited thereto, and the communication interface 110 may be implemented by any communication interface that may perform wireless communication.

In addition, the communication interface 110 may include an input and output interface that may perform wired communication with various apparatuses. For example, the communication interface 110 may include an input and output interface such as High Definition Multimedia Interface (HDMI), Mobile High-Definition Link (MHL), Universal Serial Bus (USB), RGB, D-subminiature (D-SUB), and Digital Visual Interface (DVI), and may perform communication with various apparatuses.

However, the disclosure is not limited thereto, and the input and output interface may be implemented by any standard that may perform data transmission and reception.

The electronic apparatus 100 may be connected to the plurality of sensor devices 200-1 to 200-5 to receive an audio signal. The electronic apparatus 100 may transmit a control instruction corresponding to the audio signal to another electronic apparatus. Further, the electronic apparatus 100 may transmit, to the effective sensor device, a notification message notifying a control result.

The communication interface 110 may include any communication standard interface that may perform wired or wireless communication with various apparatuses, in addition to the interfaces described above.

The processor 120 generally controls an operation of the electronic apparatus 100.

The processor 120 may be implemented by a digital signal processor (DSP) processing a digital signal, a microprocessor, or a time controller (TCON). However, the disclosure is not limited thereto, and the processor 120 may include one or more of a central processing unit (CPU), a micro controller unit (MCU), a micro processing unit (MPU), a controller, an application processor (AP), a graphics-processing unit (GPU), a communication processor (CP), or an ARM processor, or may be defined by these terms. In addition, the processor 120 may be implemented by a system-on-chip (SoC) or a large scale integration (LSI) in which a processing algorithm is embedded, or may be implemented in a field programmable gate array (FPGA) form. The processor 120 may perform various functions by executing computer executable instructions stored in a memory.

The processor 120 may receive the first audio signal and the second audio signal from the first sensor device 200-1, and the second sensor device 200-2 located away from the first sensor device 200-1, respectively, through the communication interface 110, acquire similarity between the first audio signal and the second audio signal, acquire a first predicted audio component from the first audio signal based on an operation state of an electronic apparatus located adjacent to the first sensor device 200-1, and a second predicted audio component from the second audio signal based on an operation state of an electronic apparatus located adjacent to the second sensor device 200-2 in the case where the similarity is equal to or higher than the threshold value, identify one of the first sensor device 200-1 or the second sensor device 200-2 as the effective sensor device based on the first predicted audio component and the second predicted audio component, and perform speech recognition with respect to an additional audio signal received from the effective sensor device.

Here, the electronic apparatus 100 may further include a memory (not illustrated) in which a mode-specific audio model based on an operation state of each of the electronic apparatus 100 and at least one other electronic apparatus is stored. For example, the audio model may be data classified based on a plurality of modes. As an example of the plurality of modes, a first mode may indicate a state in which a TV located adjacent to the first sensor device 200-1 and a vacuum cleaner located adjacent to the second sensor device 200-2 are turned on, a second mode may indicate a state in which only one of the TV or the vacuum cleaner is turned on, and a third mode may indicate a state in which both of the TV and the vacuum cleaner are turned off. The audio model may include information regarding audio input to each of the first sensor device 200-1 and the second sensor device 200-2 in the first mode, information regarding audio input to each of the first sensor device 200-1 and the second sensor device 200-2 in the second mode, and information regarding audio input to each of the first sensor device 200-1 and the second sensor device 200-2 in the third mode.

However, the above description of the audio model is only an example, and the audio model may be other types of data. For example, the audio model may further include operation states of a refrigerator, a washing machine, and the like, in addition to the operation states of the TV and the vacuum cleaner. An operation state of each apparatus may include further subdivided operation states, in addition to a turned-on state and a turned-off state. For example, the operation state of the TV may further include operation states such as a standby state, a frame state, and a lighting state, the operation state of the vacuum cleaner may further include operation states such as a low-noise state and a power output state, the operation state of the refrigerator may further include operation states such as a freezing storage state, a cold storage state, and a kimchi refrigerating state, and the operation state of the washing machine may further include operation states such as a blanket laundry state and a delicate washing state. Further, the audio model may include information regarding audio input to one sensor device or three or more sensor devices.

The audio model may be acquired as each of the plurality of sensor devices learns audio acquired based on an operation state of an adjacent electronic apparatus, through an artificial intelligence algorithm. However, the disclosure is not limited thereto, and the audio model may also be acquired as each of the plurality of sensor devices learns audio acquired based on an operation state of an adjacent electronic apparatus, based on a rule. The audio model may also be acquired by a separate electronic apparatus other than the electronic apparatus 100. However, the disclosure is not limited thereto, and the electronic apparatus 100 may acquire the audio model through the artificial intelligence algorithm.

The processor 120 may identify a mode corresponding to an operation state of an electronic apparatus located adjacent to the first sensor device 200-1 and an operation state of an electronic apparatus located adjacent to the second sensor device 200-2 based on the audio model, and acquire the first predicted audio component and the second predicted audio component from the first audio signal and the second audio signal based on the identified mode.

Here, the processor 120 may identify an operation state of the electronic apparatus 100 in real time. Further, the processor 120 may store an operation state of another electronic apparatus in advance. For example, the other electronic apparatus may transmit the operation state thereof to the electronic apparatus 100 at predetermined time intervals. Alternatively, the other electronic apparatus may transmit a changed operation state thereof to the electronic apparatus 100 each time the operation state is changed.

However, the disclosure is not limited thereto, and once an audio signal is received, the processor 120 may transmit a signal requesting the operation state of the other electronic apparatus to the other electronic apparatus, and receive the operation state from the other electronic apparatus.

The processor 120 may acquire the first predicted audio component and the second predicted audio component from a noise component included in the first audio signal and a noise component included in the second audio signal, respectively, based on the identified mode, acquire a first quality characteristic of the first audio signal and a second quality characteristic of the second audio signal based on a magnitude of the first predicted audio component and a magnitude of the second predicted audio component, respectively, and identify one of the first sensor device 200-1 or the second sensor device 200-2 as the effective sensor device based on the first quality characteristic and the second quality characteristic. A detailed description thereof will be provided below with reference to the drawings.

The processor 120 may change the operation state of the electronic apparatus located adjacent to the first sensor device 200-1 and the operation state of the electronic apparatus located adjacent to the second sensor device 200-2 to allow the electronic apparatus located adjacent to the first sensor device 200-1 and the electronic apparatus located adjacent to the second sensor device 200-2 to be operated in a predetermined mode according to a predetermined event. For example, the processor 120 may change the operation states of the electronic apparatus 100 and another electronic apparatus to allow the TV located adjacent to the first sensor device 200-1 and the vacuum cleaner located adjacent to the second sensor device 200-2 to be operated in a predetermined mode once the first audio signal and the second audio signal are received.

Alternatively, once each of the first sensor device 200-1 and the second sensor device 200-2 wakes up according to a trigger signal, a signal indicating that each of the first sensor device 200-1 and the second sensor device 200-2 wakes up may be transmitted to the electronic apparatus 100. The electronic apparatus 100 may also change the operation state of the electronic apparatus located adjacent to the first sensor device 200-1 and the operation state of the electronic apparatus located adjacent to the second sensor device 200-2 to allow the electronic apparatus located adjacent to the first sensor device 200-1 and the electronic apparatus located adjacent to the second sensor device 200-2 to be operated in a predetermined mode according to the received signal.

Here, the predetermined mode may be an operation state in which a volume of audio generated from each of the electronic apparatus located adjacent to the first sensor device 200-1 and the operation state of the electronic apparatus located adjacent to the second sensor device 200-2 is minimized. For example, in a state in which the TV is turned on, the processor 120 may mute the TV according to a predetermined event. Alternatively, in a state in which the vacuum cleaner is operated, the processor 120 may temporarily stop the vacuum cleaner according to a predetermined event.

With the above-described operation, the processor 120 may change the operation state of the electronic apparatus located adjacent to the first sensor device 200-1 and the operation state of the electronic apparatus located adjacent to the second sensor device 200-2 before an additional audio signal is received from the effective sensor device. As an example, at the time of uttering speech corresponding to a control instruction after the user utters speech corresponding to the trigger signal, noise caused by the electronic apparatus located adjacent to the first sensor device 200-1 and the electronic apparatus located adjacent to the second sensor device 200-2 may be significantly reduced. For example, in the case where the user utters "Hi Bixby, show me today's movie list" in a state in which the TV is turned on, the processor 120 may identify "Hi Bixby" as a trigger signal and mute the TV before "show me today's movie list". An audio signal corresponding to "show me today's movie list" may have noise relatively lower than that before the muting. With such an operation, speech recognition performance may be improved.

The processor 120 may control one of the electronic apparatus 100 or at least one other electronic apparatus based on a speech recognition result, and control the effective sensor device to provide a notification message notifying a control result.

For example, the processor 120 may change a channel of the TV according to the speech recognition result, and transmit, to the effective sensor device, a notification message notifying that the channel of the TV is changed. The effective sensor device may include a speaker and output the notification message notifying that the channel of the TV is changed through the speaker. Alternatively, the effective sensor device may include a display and display the notification message notifying that the channel of the TV is changed through the display.

The processor 120 may acquire time domain similarity between the first audio signal and the second audio signal, acquire frequency domain similarity between the first audio signal and the second audio signal, and acquire the similarity based on at least one of the time domain similarity or the frequency domain similarity.

For example, the processor 120 may acquire time domain similarity through cross-correlation of the first audio signal and the second audio signal, and determine similarity between the first audio signal and the second audio signal by using the time domain similarity. Alternatively, the processor 120 may acquire frequency domain similarity through spectral coherence and determine similarity between the first audio signal and the second audio signal by using the frequency domain similarity Alternatively, the processor 120 may determine similarity between the first audio signal and the second audio signal by calculating a weighted sum of the time domain similarity and the frequency domain similarity.

The processor 120 may acquire similarity in the case where the second audio signal is received within a threshold time from when the first audio signal is received. As an example, the processor 120 may not acquire the similarity in the case where the second audio signal is received after the threshold time from when the first audio signal is received. For example, the processor 120 may acquire similarity in the case where the second audio signal is received within 0.01 second from when the first audio signal is received, and may finally identify the effective sensor device based on the acquired similarity.

Alternatively, the processor 120 may acquire similarity based on an utterance point in time of the first audio signal and an utterance point in time of the second audio signal. For example, the processor 120 may receive at least one of time information indicating speech activity of user speech, or time information indicating the end points of user speech from each of the first sensor device 200-1 and the second sensor device 200-2. Further, the processor 120 may compare user speech start points based on the received information, and acquire similarity between the first audio signal and the second audio signal in the case where a difference between the user speech start points is equal to or shorter than a threshold time.

As an example, the processor 120 may identify the effective sensor device based on reception points in time of the first audio signal and the second audio signal, and the similarity between the first audio signal and the second audio signal. Accordingly, the processor 120 may address problems that may occur in the case where a plurality of users utter speech.

For example, in the case where a first user utters a first user speech in the vicinity of the first sensor device 200-1, a second user utters a second user speech in the vicinity of the second sensor device 200-2, and a difference between an utterance point in time of the first user and an utterance point in time of the second user exceeds a threshold time, the processor 120 may perform a control operation corresponding to each of the first user speech and the second user speech without performing the operation of acquiring similarity and the operation of identifying the effective sensor device.

Alternatively, in the case where the first user utters the first user speech in the vicinity of the first sensor device 200-1, the second user utters the second user speech in the vicinity of the second sensor device 200-2, and the difference between the utterance point in time of the first user and the utterance point in time of the second user is equal to or shorter than the threshold time, the processor 120 may acquire the similarity. In this case, however, the similarity may be lower than the threshold value. Therefore, the processor 120 may determine that the first audio signal and the second audio signal received from the first and second sensor devices 200-1 and 200-2, respectively, are different signals from each other, and may perform speech recognition with respect to each of the first audio signal and the second audio signal. Even in the case where the first user speech is input to the second sensor device 200-2 and the second user speech is input to the first sensor device 200-1, an audio volume of the first user speech is higher than that of the second user speech in the vicinity of the first sensor device 200-1, and an audio volume of the second user speech is higher than that of the first user speech in the vicinity of the second sensor device 200-2. Further, a tone of the first user speech and a tone of the second user speech are different from each other, and thus an audio signal received by the first sensor device 200-1 and an audio signal received by the second sensor device 200-2 are different from each other, such that the processor 120 acquires similarity that is lower than the threshold value.

Once one of the first sensor device 200-1 or the second sensor device 200-2 is identified as the effective sensor device, the processor 120 may ignore an additional audio signal received from the other one of the first sensor device 200-1 or the second sensor device 200-2 within a threshold time from when the effective sensor device is identified.

For example, in the case where the first sensor device 200-1 is identified as the effective sensor device, the processor 120 may perform speech recognition only with respect to an additional audio signal received from the first sensor device 200-1 and may not perform speech recognition with respect to an additional audio signal received from the second sensor device 200-2. Alternatively, in the case where the first sensor device 200-1 is identified as the effective sensor device, the processor 120 may transmit, to the second sensor device 200-2, an instruction to stop an audio receiving function of the second sensor device 200-2 during the threshold time. In the case where the second sensor device 200-2 does not receive audio during the threshold time, the processor 120 may receive only the additional audio signal transmitted from the first sensor device 200-1 during the threshold time.

As described above, the processor 120 may identify only one of the first sensor device 200-1 or the second sensor device 200-2 as a device for performing speech recognition, in the case where the first audio signal and the second audio signal similar to each other are received from the first and second sensor devices 200-1 and 200-2, respectively. For example, the processor 120 may determine the effective sensor device by predicting only audio components of the first audio signal and the second audio signal similar to each other and perform speech recognition with respect to an audio signal received from the effective sensor device. As an example, speech recognition is not performed with respect to all audio signals, such that it is possible to significantly reduce a waste of resources, improve network efficiency, and address a problem such as duplication of processing.

The operation of the processor 120 in the case where the second audio signal is received within the threshold time from when the first audio signal is received, and the similarity is equal to or higher than the threshold value has been described above.

In contrast, in the case where the second audio signal is received after the threshold time from when the first audio signal is received, or the similarity is lower than a threshold value, the processor 120 may identify the first sensor device 200-1 and the second sensor device 200-2 as a first effective sensor device and a second effective sensor device, respectively, and perform speech recognition with respect to an additional audio signal received from each of the first effective sensor device and the second effective sensor device. As an example, in the case where the second audio signal is received after the threshold time from when the first audio signal is received, or in the case where the similarity is lower than the threshold value, the processor 120 may identify the first audio signal and the second audio signal as signals different from each other, and may perform speech recognition with respect to each of an additional audio signal received from the first effective sensor device and an additional audio signal received from the second effective sensor device. At this time, the processor 120 may sequentially or simultaneously process a plurality of additional audio signals.

The processor 120 may determine whether to acquire similarity between the first audio signal and the second audio signal based on an audio volume or power of each of the first audio signal and the second audio signal. For example, in the case where the audio volume of the first audio signal is lower than a threshold value, the processor 120 may not acquire the similarity and identify the second effective sensor device 200-2 transmitting the second audio signal as the effective sensor device.

The processor 120 may keep a speech recognition function in a standby state before an audio signal is received. As an example, the processor 120 may keep a module for performing speech recognition in a standby state before an audio signal is received. The processor 120 may release the standby state once an audio signal is received. With such an operation, power consumption may be reduced.

The case where the processor 120 identifies the effective sensor device after receiving the first audio signal and the second audio signal and performs speech recognition with respect to an additional audio signal received from the effective sensor device has been described above. For example, the first sensor device 200-1 and the second sensor device 200-2 may receive an utterance "Hi Bixby", and the processor 120 may receive the first audio signal and the second audio signal from the first sensor device 200-1 and the second sensor device 200-2, respectively, and identify the first sensor device 200-1 as the effective sensor device. The first sensor device 200-1 and the second sensor device 200-2 may receive an utterance "Turn on the TV", the processor 120 may receive an additional audio signal corresponding to "Turn on the TV" from the first sensor device 200-1, and perform speech recognition with respect to the additional audio signal. As an example, the case where speech recognition is performed only with respect to the audio signal received after the trigger signal has been described above.

However, the disclosure is not limited thereto, and the user may also control the TV only with the utterance "Turn on the TV" without the utterance such as "Hi Bixby". For example, the first sensor device 200-1 and the second sensor device 200-2 may receive an utterance "Turn on the TV", and the processor 120 may receive the first audio signal and the second audio signal from the first sensor device 200-1 and the second sensor device 200-2, respectively, and identify the first sensor device 200-1 as the effective sensor device. Further, the processor 120 may perform speech recognition with respect to the first audio signal received from the first sensor device 200-1 and perform speech recognition with respect to an additional audio signal additionally received from the first sensor device 200-1. In this case, the first sensor device 200-1 and the second sensor device 200-2 may be continuously in a state in which a standby mode is released.

Although the case where the electronic apparatus 100 receives a plurality of audio signals from a plurality of sensor devices has been described above, the disclosure is not limited thereto. For example, the electronic apparatus 100 may include a microphone (not illustrated), the communication interface 110, and the processor 120. Further, the processor 120 may receive a first audio signal through the microphone, receive a second audio signal from a sensor device through the communication interface 110, acquire similarity between the first audio signal and the second audio signal, acquire a first predicted audio component and a second predicted audio component from the first audio signal and the second audio signal, respectively, based on an operation state of each of the electronic apparatus 100 and an electronic apparatus located adjacent to the sensor device in the case where the similarity is equal to or higher than a threshold value, identify one of the electronic apparatus 100 or the sensor device as the effective device based on the first predicted audio component and the second predicted audio component, and perform speech recognition with respect to an additional audio signal received from the effective device. For example, in the case where the electronic apparatus 100 is an air conditioner, the air conditioner may acquire a first quality characteristic of a first audio signal directly received through a microphone provided in the air conditioner based on an operation state of the air conditioner. The air conditioner may identify the effective device by comparing the first quality characteristic with a second quality characteristic of a second audio signal received from a sensor device.

Functions related to artificial intelligence according to the disclosure are performed by the processor 120 and the memory.

The processor 120 may be constituted by one processor or a plurality of processors. Here, the one or plurality of processors may be a general processor such as a CPU, an AP, or a digital signal processor (DSP), a graphic dedicated processor such as a GPU or a vision processing unit (VPU), or an artificial intelligence dedicated processor such as a neural processing unit (NPU).

The one or plurality of processors perform a control to process input data according to a pre-defined operation rule stored in the memory or an artificial intelligence model. Alternatively, in the case where the one or plurality of processors are an artificial intelligence dedicated processor, the artificial intelligence dedicated processor may be designed to have a hardware structure specialized in processing of a specific artificial intelligence model. The pre-defined operation rule or the artificial intelligence model is obtained through learning.

Here, obtaining the pre-defined operation rule or the artificial intelligence model through learning means that a basic artificial intelligence model learns multiple learning data by using a learning algorithm to obtain the pre-defined operation rule or the artificial intelligence model set to achieve a desired characteristic (or purpose). Such learning may be performed by a device in which artificial intelligence is performed according to the disclosure, or may be performed through a separate server and/or system. Examples of the learning algorithm include supervised learning, unsupervised learning, semi-supervised learning, and reinforcement learning, but are not limited thereto.

The artificial intelligence model may be constituted by a plurality of neural network layers. Each of the plurality of neural network layers may have a plurality of weight values, and a neural network calculation may be performed by using a calculation result of a previous layer and through calculation using the plurality of weight values. The plurality of weight values of the plurality of neural network layers may be optimized by a learning result of the artificial intelligence model. For example, the plurality of weight values may be updated to decrease or minimize a loss value or cost value acquired by the artificial intelligence model during the learning process.

An artificial neural network may include a deep neural network (DNN). For example, the artificial neural network may be a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-network, but is not limited thereto.

Figure 2B:
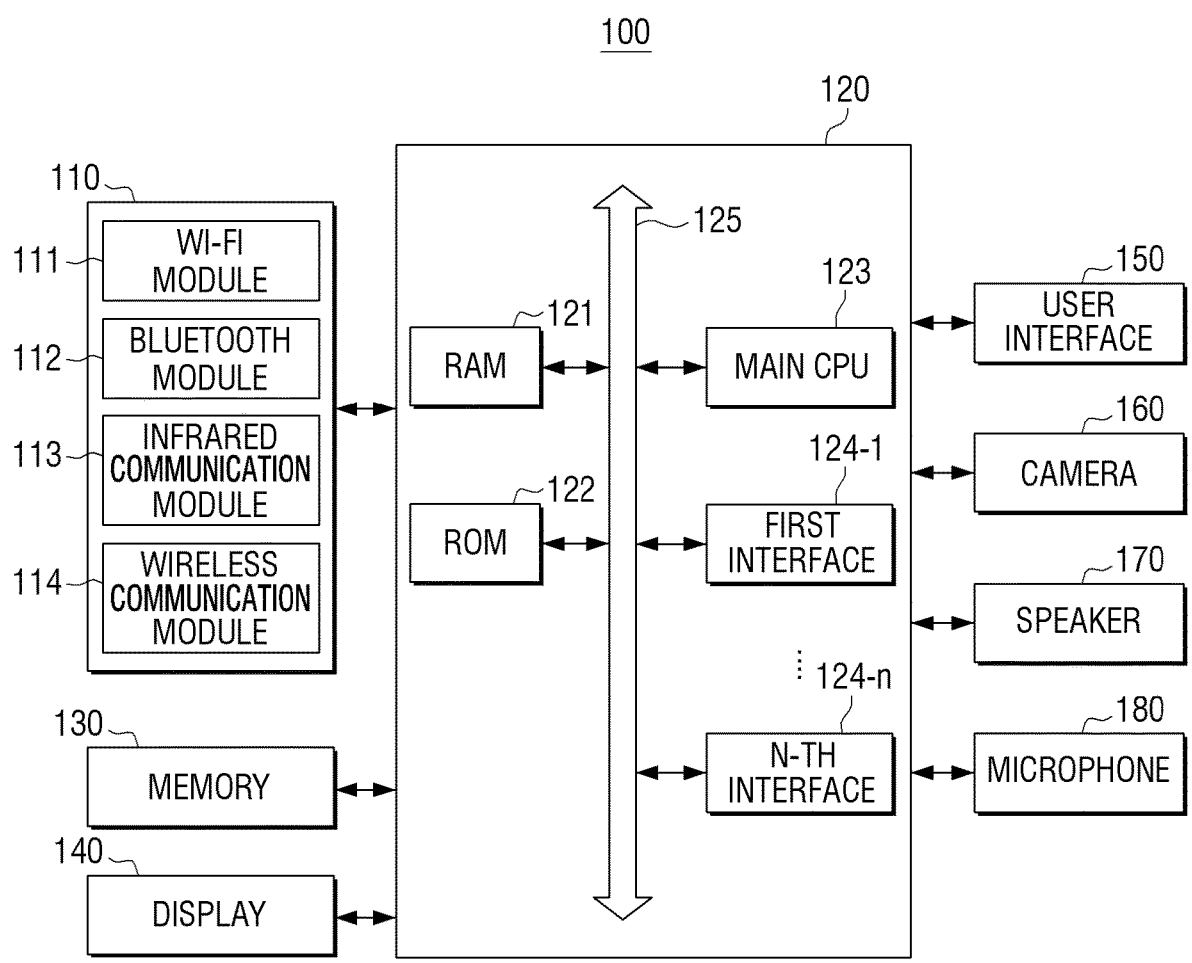
FIG. 2B is a block diagram illustrating an example of a specific configuration of an electronic apparatus according to an embodiment of the disclosure.

FIG. 2B is a block diagram illustrating an example of a specific configuration of an electronic apparatus according to an embodiment of the disclosure.

Referring to FIG. 2B, the electronic apparatus 100 may include the communication interface 110, the processor 120, a memory 130, a display 140, a user interface 150, a camera 160, a speaker 170, and a microphone 180. A detailed description for components overlapping those illustrated in FIG. 2A among components illustrated in FIG. 2B will be omitted.

The communication interface 110 is a component for performing communication with various types of external apparatuses in various types of communication manners. The communication interface 110 includes a Wi-Fi module 111, a Bluetooth module 112, an infrared communication module 113, a wireless communication module 114, and the like. Here, each communication module may be implemented in a form of at least one hardware chip.

The processor 120 may perform communication with various external apparatuses using the communication interface 110. Here, the external apparatus may include the plurality of sensor devices 200-1 to 200-2, a display device such as a TV, an image processing device such as a set-top box, an external server, a control device such as a remote controller, a sound output device such as a Bluetooth speaker, a lighting device, a home appliance such as a smart cleaner or a smart refrigerator, a server such as an IoT home manager, and the like.

The Wi-Fi module 111 and the Bluetooth module 112 perform communication in a Wi-Fi manner and a Bluetooth manner, respectively. In the case of using the Wi-Fi module 111 or the Bluetooth module 112, various kinds of connection information such as a service set identifier (SSID) and a session key are first transmitted and received, communication connection is performed using the connection information, and various kinds of information may be transmitted and received.

The infrared communication module 113 performs communication according to an infrared data association (IrDA) technology using infrared light which lies between visible light and millimeter waves for short-distance wireless data transmission.

The wireless communication module 114 may include at least one communication chip for performing communication depending on various wireless communication protocols such as Zigbee, $3^{rd}$ generation (3G), $3^{rd}$ generation partnership project (3GPP), long term evolution (LTE), LTE Advanced (LTE-A), $4^{th}$ generation (4G), and $5^{th}$ generation (5G), in addition to the communication manner described above.

In addition, the communication interface 110 may include at least one of wired communication modules for performing communication by using a local area network (LAN) module, an Ethernet module, a pair cable, a coaxial cable, an optical fiber cable, or the like.

The communication interface 110 may further include an input and output interface. The input and output interface may be one of HDMI, MHL, USB, DisplayPort (DP), a thunderbolt, a video graphics array (VGA) port, an RGB port, a D-SUB, or a DVI.

The input and output interface may input and output at least one of an audio signal or a video signal.

In an implementation example, the input and output interface may include a port for inputting and outputting only an audio signal and a port for inputting and outputting only a video signal, or may be implemented as one port for inputting and outputting both of the audio signal and the video signal.

The memory 130 may be implemented by an internal memory such as a read-only memory (ROM) (for example, an electrically erasable programmable read only memory (EEPROM)) or a random access memory (RAM) included in the processor 120 or be implemented by a memory separate from the processor 120. In this case, the memory 130 may be implemented in a form of a memory embedded in the electronic apparatus 100 or a form of a memory attachable to and detachable from the electronic apparatus 100, depending on a data storing purpose. For example, data for driving the electronic apparatus 100 may be stored in the memory embedded in the electronic apparatus 100, and data for an extension function of the electronic apparatus 100 may be stored in the memory attachable to and detachable from the electronic apparatus 100. The memory embedded in the electronic apparatus 100 may be implemented by at least one of a volatile memory (for example, a dynamic RAM (DRAM), a static RAM (SRAM), or a synchronous dynamic RAM (SDRAM)), a non-volatile memory (for example, a one time programmable ROM (OTPROM), a programmable ROM (PROM), an erasable and programmable ROM (EPROM), an EEPROM, a mask ROM, a flash ROM, a flash memory (for example, a NAND flash or a NOR flash), a hard drive, or a solid state drive (SSD), and the memory attachable to and detachable from the electronic apparatus 100 may be implemented by a memory card (for example, a compact flash (CF), a secure digital (SD), a micro secure digital (Micro-SD), a mini secure digital (Mini-SD), an extreme digital (xD), or a multi-media card (MMC)), an external memory (for example, a USB memory) connectable to the USB port, or the like.

The memory 130 stores various data such as an operating system (O/S) software module for driving the electronic apparatus 100, an audio processing module, and a speech recognition module.

The processor 120 generally controls an operation of the electronic apparatus 100 using various programs stored in the memory 130.

As an example, the processor 120 includes a RAM 121, a ROM 122, a main CPU 123, first to n-th interfaces 124-1 to 124-n, and a bus 125.

The RAM 121, the ROM 122, the main CPU 123, the first to n-th interfaces 124-1 to 124-*n*, and the like, may be connected to one another through the bus 125.

An instruction set for booting a system, or the like, is stored in the ROM 122. Once a turn-on instruction is input to supply power to the main CPU 123, the main CPU 123 copies the O/S stored in the memory 130 to the RAM 121 according to an instruction stored in the ROM 122, and executes the O/S to boot the system. Once the booting is completed, the main CPU 123 copies various application programs stored in the memory 130 to the RAM 121, and executes the application programs copied to the RAM 121 to perform various operations.

The main CPU 123 accesses the memory 130 to perform booting using the O/S stored in the memory 130. In addition, the main CPU 123 performs various operations using various programs, content data, and the like, stored in the memory 130.

The first to n-th interfaces 124-1 to 124-*n* are connected to the various components described above. One of the interfaces may be a network interface connected to an external apparatus through a network.

The processor 120 may perform a graphic processing function (video processing function). For example, the processor 120 may render a screen including various objects such as an icon, an image, and a text by using a calculator (not illustrated) and a renderer (not illustrated). Here, the calculator (not illustrated) may calculate attribute values such as coordinate values at which the respective objects will be displayed, forms, sizes, and colors of the respective objects depending on a layout of the screen based on a received control instruction. Further, the renderer (not illustrated) may render screens of various layouts including objects based on the attribute values calculated in the calculator (not illustrated). Further, the processor 120 may perform various kinds of image processing such as decoding, scaling, noise filtering, frame rate conversion, and resolution conversion with respect to the video data.

The processor 120 may perform processing with respect to audio data. As an example, the processor 120 may perform various kinds of processing such as decoding, amplifying, and noise filtering with respect to the audio data.

The display 140 may be implemented by various types of displays such as a liquid crystal display (LCD), an organic light emitting diode (OLED) display, and a plasma display panel (PDP). A driving circuit that may be implemented in a form such as an a-Si thin film transistor (TFT), a low temperature poly silicon (LTPS) TFT, and an organic TFT (OTFT), a backlight unit, and the like may be included in the display 140. The display 140 may be implemented by a touch screen combined with a touch sensor, a flexible display, a three-dimensional (3D) display, or the like.

The user interface 150 may be implemented by a device such as a button, a touch pad, a mouse, or a keyboard, or may be implemented by a touch screen that may perform the above-described display function and an operation input function. Here, the button may be various types of buttons such as a mechanical button, a touch pad, and a wheel formed in any region such as a front surface portion, a side surface portion, or a rear surface portion of a body appearance of the electronic apparatus 100.

The camera 160 is a component for capturing an image or a video according to a control by the user. The camera 160 may capture an image at a specific point in time, or may capture sequential images.

The speaker 170 may be a component for outputting various notification sounds, an audio message, or the like, as well as various audio data processed by the input and output interface.

The microphone 180 is a component for receiving a user's voice or other sounds and converting the user's voice or other sounds into audio data.

The microphone 180 may receive speech of the user in an activated mode. For example, the microphone 180 may be formed integrally with the electronic apparatus 100 at an upper side, a front surface, a side surface, or the like, of the electronic apparatus 100. The microphone 180 may include various components such as a microphone for collecting user speech in analog form, an amplifier circuit for amplifying the collected user speech, an A/D conversion circuit for sampling the amplified user speech and for converting the user speech into a digital signal, and a filter circuit for removing a noise component from the digital signal obtained by the conversion.

The electronic apparatus 100 may receive an audio signal including user speech from a sensor device including the microphone. In this case, the received audio signal may be a digital speech signal, but may also be an analog speech signal in an implementation example. In an example, the electronic apparatus 100 may receive an audio signal by a wireless communication method such as Bluetooth or Wi-Fi.

The electronic apparatus 100 may perform speech recognition by directly applying an automatic speech recognition (ASR) technology to the digital speech signal received from the sensor device.

Alternatively, the electronic apparatus 100 may transmit the speech signal received from the sensor device to an external service for speech recognition.

In this case, communication modules for communication with the sensor device and the external server may be implemented as one module or separate modules. For example, communication with the sensor device may be performed by using the Bluetooth module and communication with the external server may be performed by using an Ethernet modem or the Wi-Fi module.

The external server may perform speech recognition by applying the ASR technology to the digital speech signal and transmit a speech recognition result to the electronic apparatus 100.

Figure 2C:
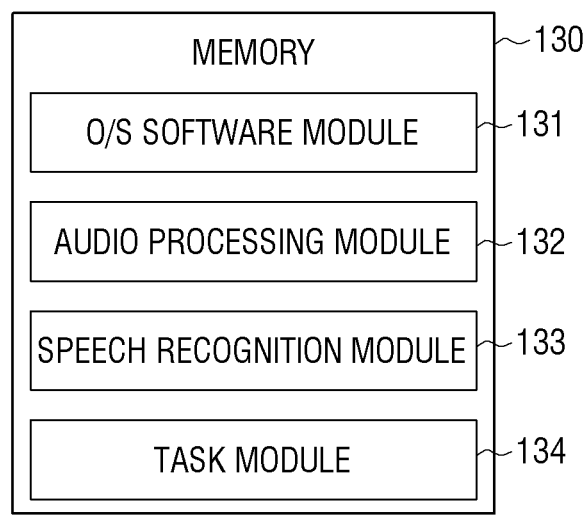
FIG. 2C is a block diagram illustrating an example of modules stored in a memory according to an embodiment of the disclosure.

FIG. 2C is a block diagram illustrating an example of modules stored in a memory according to an embodiment of the disclosure.

Referring to FIG. 2C, the memory 130 may include software and/or firmware configured as one or more modules. The module may correspond to a set of computer-executable instructions.

The memory 130 may include an O/S software module 131, an audio processing module 132, a speech recognition module 133, and a task module 134. The modules 131 to 134 may be executed by the processor 120 to perform various functions.

The O/S software module 131 may be a module for driving the electronic apparatus 100. For example, the processor 120 may perform functions such as a turn-on and turn-off operation of the electronic apparatus 100, power management of the electronic apparatus 100, driving of an application, and a control of another electronic apparatus, by using the O/S software module 131.

The audio processing module 132 may be a module for performing analysis of an audio signal, determination of similarity, and the like. For example, the processor 120 may acquire similarity between the first audio signal and the second audio signal by using the audio processing module 132.

The speech recognition module 133 may perform speech recognition. The speech recognition module 133 may use the ASR technology.

The speech recognition module 133 may convert an audio signal corresponding to an utterance of the user into text data. Example functions of the speech recognition module 133 will be described with reference to FIG. 2D.

Figure 2D:
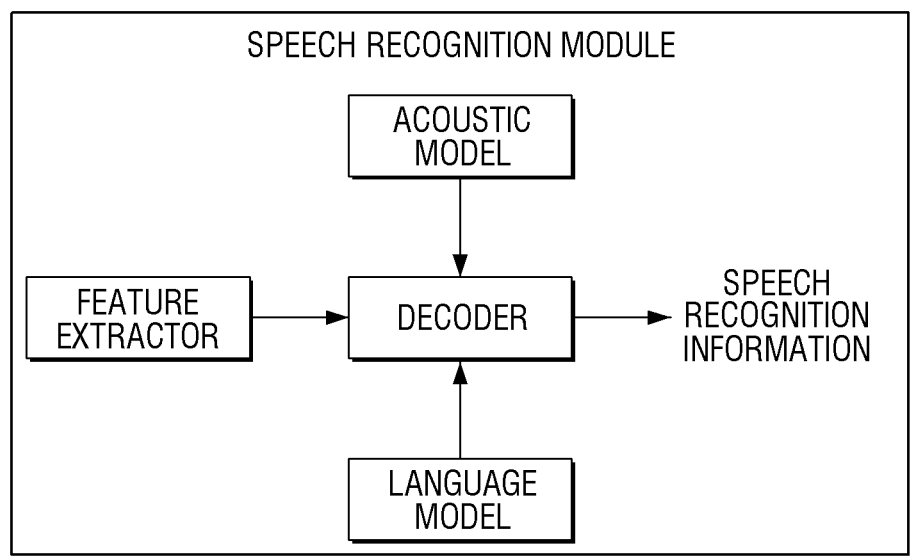
FIG. 2D is a block diagram illustrating an example of a speech recognition module according to an embodiment of the disclosure.

FIG. 2D is a block diagram illustrating an example of a speech recognition module according to an embodiment of the disclosure.

Referring to FIG. 2D, the speech recognition module 133 may include a feature extractor and a decoder. The feature extractor may extract feature information (feature vector) from the audio signal. The decoder may acquire speech recognition information corresponding to the feature information based on an acoustic model and a language model. The speech recognition information may include pronunciation information, phoneme information, character string information that corresponds to feature information acquired based on the acoustic model, and text data corresponding to the acquired pronunciation information based on the language model.

According to another embodiment, the speech recognition module 133 may include any one of the acoustic model or the language module, or may include both of the acoustic model and the language module and use only one of them. In this case, the speech recognition module 133 may apply only one of the acoustic model or the language module to acquire the speech recognition information. For example, the speech recognition information may include pronunciation information, phoneme information, character string information acquired based on the acoustic model, or text information acquired based on the language model. As an example, the speech recognition information may include pronunciation information, phoneme information, or character string information, rather than text data, the pronunciation information, the phoneme information, or the character string information being an intermediate output and the text data being a final output. In this case, the speech recognition information is transmitted to another device and the other device may apply the acoustic model or language model that is not applied, to finally acquire text data.

According to another embodiment, the speech recognition module 133 may not include both of the acoustic model and the language module, or may not use the acoustic model or the language module even in the case of including at least one of the acoustic model or the language module. In this case, the speech recognition module 133 may perform only the feature information extracting operation to output the speech recognition information including the feature information. The speech recognition information may be transmitted to another device and the other device may apply the acoustic model and language model to finally acquire text data.

According to another embodiment, the electronic apparatus 100 may not include the speech recognition module itself, or may not use the speech recognition module even in the case of including the speech recognition module. In this case, the electronic apparatus 100 may transmit an audio signal acquired through the microphone 180 to another device and the other device may perform speech recognition.

As such, selective use of the functions of the speech recognition module 133 may reduce a calculation load in the electronic apparatus 100.

Further, in the case where speech recognition information which is an intermediate output is received from an external apparatus, the speech recognition module 133 may perform the remaining speech recognition processing with respect to the speech recognition information. For example, in the case where speech recognition information received from an external apparatus is information to which the acoustic model is applied and the language model is not applied, the speech recognition module 133 may apply the language model to the received speech recognition information to acquire a final recognition result. As another example, in the case where the speech recognition information received from the external apparatus includes only feature information, the speech recognition module 133 may apply the language model and the acoustic model to the received speech recognition information to acquire a final recognition result.

Once the text data are acquired from the audio signal through the speech recognition module 133, the text data may be transferred to the task module 134.

The task module 134 may analyze the text data transferred from the speech recognition module 133 to analyze a meaning thereof, and perform a task corresponding to the meaning. The task module 134 may use a natural language processing (NLP) technology.

The task module 134 may identify a task to be performed based on the analyzed meaning Various types of tasks such as playing music, setting a schedule, calling, and responding to an inquiry may be performed. Further, the tasks may include a task for controlling another electronic apparatus.

According to an embodiment of the disclosure, an artificial intelligence agent program for performing a task may be stored in the electronic apparatus 100.

The artificial intelligence agent program is a dedicated program for providing an artificial intelligence (AI) based service (for example, a speech recognition service, a personal secretary program, a translation service, or a search service) and may be executed by an existing general processor (for example, a CPU) or a separate AI dedicated processor (for example, a GPU). The processor 120 may include at least one of the general processor or the AI dedicated processor.

In particular, the artificial intelligence agent program may include a dialogue system capable of processing a user instruction and an operation corresponding to the user instruction, and capable of processing a notification message therefor with a natural language. The dialogue system may include the speech recognition module 133 and the task module 134. A description thereof will be provided below.

Figure 2E:
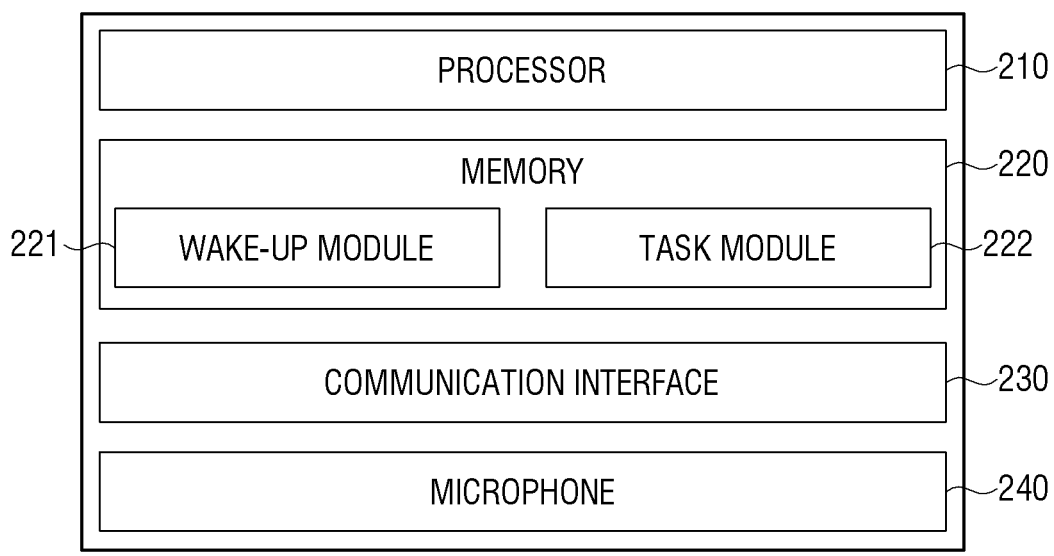
FIG. 2E is a block diagram illustrating an example of a configuration of a sensor device according to an embodiment of the disclosure.

FIG. 2E is a block diagram illustrating an example of a configuration of a sensor device according to an embodiment of the disclosure.

Referring to FIG. 2E, a sensor device 200 includes a processor 210, a memory 220, a communication interface 230, and a microphone 240.

The processor 210 is a component for controlling a general operation of the sensor device 200. For example, the processor 210 may drive an operating system or an application to control multiple hardware or software components connected to the processor 210, and perform various kinds of data processing and calculation. The processor 210 may be a CPU, a GPU, or both. The processor 210 may be implemented by at least one general processor, a digital signal processor, an application specific integrated circuit (ASIC), a system on chip (SoC), a microcomputer (MICOM), or the like.

The memory 220 may include an internal memory or an external memory. The memory 220 is accessed by the processor 210, and readout, recording, correction, deletion, update, and the like, of data in the memory 220 may be performed by the processor 210.

The memory 220 may include software and/or firmware configured as one or more modules. The module may correspond to a set of computer-executable instructions.

The memory 220 may include a wake-up module 221 and a task module 222. The modules 221 and 222 may be executed by the processor 210 to perform various functions.

The wake-up module 221 may recognize a predetermined trigger word or a phrase in an audio signal. For example, the wake-up module 221 may recognize a trigger word included in user speech acquired through the microphone 240. Once the trigger word is recognized, a standby mode of the sensor device 200 may be released. For example, the wake-up module 221 may activate a recording function of the microphone 240 and the communication interface 230.

The sensor device 200 may not include the wake-up module 221, and in this case, the standby mode of the sensor device 200 may be released by a user manual operation. For example, the standby mode may be released as a specific button provided in the sensor device 200 is selected. As another example, the sensor device 200 may perform only recording and transmit an audio signal to an external apparatus, for example, the electronic apparatus 100 or a server 300, and the external apparatus may recognize a trigger word to release the standby mode of the sensor device 200.

The wake-up module 221 is not necessarily provided. For example, the sensor device 200 may not include the wake-up module 221, and in this case, the sensor device 200 may not enter the standby mode.

Once user speech is received, the task module 222 may detect the user speech through at least one of the VAD or the EPD.

Further, the task module 222 may determine whether to transmit at least one of time information indicating speech activity of user speech, or time information indicating the end points of the user speech, in addition to an audio signal corresponding to the user speech. For example, in the case where it is determined that audio received through the microphone 240 does not include user speech, the task module 222 may not transmit an audio signal to the electronic apparatus 100.

The communication interface 230 may be connected to a network through, for example, wireless communication or wired communication to perform communication with the external apparatus. The wireless communication, which is, for example, a cellular communication protocol, may use at least one of LTE, LTE-A, code division multiple access (CDMA), wideband CDMA (WCDMA), universal mobile telecommunications system (UMTS), Wireless Broadband (WiBro), and Global System for Mobile Communications (GSM). In addition, the wireless communication may include, for example, short distance communication. The short distance communication may include at least one of, for example, Wi-Fi direct, Bluetooth, near field communication (NFC), and Zigbee. The wired communication may include at least one of, for example, USB, HDMI, recommended standard 232 (RS-232), or plain old telephone service (POTS). The network may include at least one of communication networks such as a computer network (for example, a local area network (LAN) or a wide area network (WAN)), the Internet, and a telephone network.

The microphone 240 is a component for receiving a sound. The microphone 240 may convert the received sound into an electric signal. The microphone 240 may be implemented integrally with the sensor device 200 or be separated from the sensor device 200. The separated microphone 240 may also be electrically connected to the sensor device 200. The number of microphones 240 may be plural. A moving direction of the user may be detected by using a plurality of microphones.

The processor 210 may perform various functions by executing computer executable instructions (modules) stored in the memory 220.

According to an embodiment, the processor 210 may execute the computer readable instructions stored in the memory 220 to acquire user speech including the predetermined trigger word through the microphone 240 and control the communication interface 230 to transmit an audio signal corresponding to the user speech to the electronic apparatus 100.

Although not illustrated, the sensor device 200 may include a user input receiver. The user input receiver may receive various user inputs such as a touch input, a motion input, and an operation of a button. For example, the user input receiver may include a button, a touch panel, and the like. Further, the sensor device 200 may further include a display for displaying various information. The display may include, for example, a light emitting diode (LED), a liquid crystal display (LCD), or the like. Further, the sensor device 200 may further include a camera. An image captured by using the camera may be used to determine a moving direction of the user or attenuate noise transmitted through the microphone 240. Further, the sensor device 200 may further include a speaker. A notification message notifying a control result may be output through the speaker.

Figure 2F:
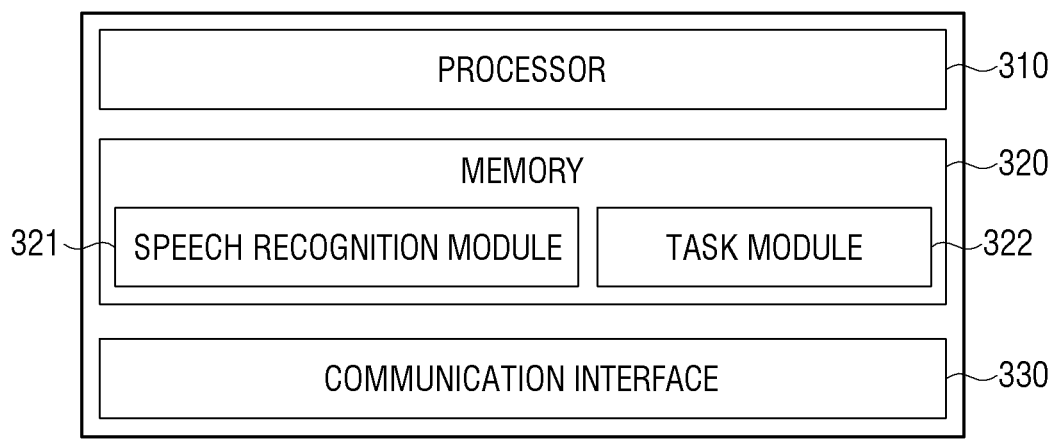
FIG. 2F is a block diagram illustrating an example of a configuration of a server according to an embodiment of the disclosure.

FIG. 2F is a block diagram illustrating an example of a configuration of a server according to an embodiment of the disclosure.

Referring to FIG. 2F, a server 300 includes a processor 310, a memory 320, and a communication interface 330.

The processor 310 is a component for controlling a general operation of the server 300. For example, the processor 310 may drive an operating system or an application to control multiple hardware or software components connected to the processor 310, and perform various kinds of data processing and calculation. The processor 310 may be a CPU, a GPU, or both. The processor 310 may be implemented by at least one general processor, a digital signal processor, an ASIC, a SoC, a MICOM, or the like.

The memory 320 may include an internal memory or an external memory. The memory 320 is accessed by the processor 310, and readout, recording, correction, deletion, update, and the like, of data in the memory 320 may be performed by the processor 310.

The memory 320 may include software and/or firmware configured as one or more modules. The module may correspond to a set of computer-executable instructions.

The memory 320 may include a speech recognition module 321 and a task module 322. The modules 321 and 322 may be executed by the processor 310 to perform various functions.

The speech recognition module 321 may perform the same function as that of the speech recognition module 133 described above.

The task module 322 may perform a task of transmitting a specific control signal to at least one of the electronic apparatus 100 or another electronic apparatus based on a speech recognition result. For example, in the case where a final recognition result is "Turn on the TV", the task module 322 may perform a task of transmitting, to the TV, a control signal to turn on the TV.

The communication interface 330 may be connected to a network through, for example, wireless communication or wired communication to perform communication with an external apparatus. The wireless communication, which is, for example, a cellular communication protocol, may use at least one of LTE, LTE-A, CDMA, WCDMA, UMTS, WiBro, and GSM. In addition, the wireless communication may include, for example, short distance communication. The short distance communication may include at least one of, for example, Wi-Fi direct, Bluetooth, NFC, and Zigbee. The wired communication may include at least one of, for example, USB, HDMI, recommended standard 232 (RS-232), or plain old telephone service (POTS). The network may include at least one of communication networks such as a computer network (for example, a local area network (LAN) or a wide area network (WAN)), the Internet, and a telephone network.

The processor 310 may perform various functions by executing computer executable instructions (modules) stored in the memory 320.

According to an embodiment, the processor 310 may execute computer executable instructions stored in the memory 320 to perform speech recognition with respect to an audio signal received from the electronic apparatus 100 or the sensor device 200. In addition, the processor 310 may control the communication interface 330 to transmit a control instruction corresponding to a speech recognition result to an apparatus corresponding to the speech recognition result.

Further, the processor 310 may also perform an operation of identifying the effective sensor device, rather than speech recognition. For example, the processor 310 may receive the first and second audio signals from the electronic apparatus 100 or two of the plurality of sensor devices 200-1 to 200-5, respectively. Further, the processor 310 may perform an operation such as determination of the effective sensor device similarly to the processor 120 of the electronic apparatus 100, and thus an overlapping description will be omitted.

In the case where the server 300 identifies the effective sensor device, an apparatus transmitting an audio signal to the server 300 may additionally provide identification information to the server 300. For example, the server 300 may perform communication with an electronic apparatus and a plurality of sensor devices in a first home, an electronic apparatus and a plurality of sensor devices in a second home, . . . , and an electronic apparatus and a plurality of sensor devices in an n-th home, and in the case of receiving only an audio signal, the server may not identify which home's sensor device is the effective sensor device. Therefore, in the case where the server 300 identifies the effective sensor device, an apparatus or a sensor device may transmit identification information to the server 300, in addition to an audio signal. Here, the identification information may include at least one of account information, user information, or location information.

The sensor device in each home may directly transmit the audio signal and the identification information to the server 300. Alternatively, the sensor device in each home may transmit the audio signal and the identification information to an electronic apparatus in the same home and the electronic apparatus may transmit the audio signal and the identification information to the server 300.

As described above, the electronic apparatus 100 may prioritize one of the plurality of sensor devices 200-1 to 200-5 to prevent problems such as duplication of processing, and a waste of resources.

Hereinafter, operations of the electronic apparatus 100 and the plurality of sensor devices 200-1 to 200-5 will be described in more detail with reference to the drawings.

FIGS. 3, 4, 5, and 6 are diagrams for describing a speech recognition method according to an embodiment of the disclosure.

Referring to FIGS. 3, 4 5, and 6, it is assumed that the electronic system 1000 includes one electronic apparatus 100 such as a TV, first to fourth sensor devices 200-1 to 200-4, and other electronic apparatuses such as an air conditioner and a refrigerator. Further, it is assumed that the first sensor device 200-1 is disposed close to the electronic apparatus 100, the second sensor device 200-2 is disposed close to the refrigerator, and the third sensor device 200-3 is disposed close to the air conditioner. Further, a situation in which the user utters speech in the vicinity of the first sensor device 200-1 is assumed. In this case, the effective sensor device needs to be the first sensor device 200-1 that is located closest to the user.

Figure 3:
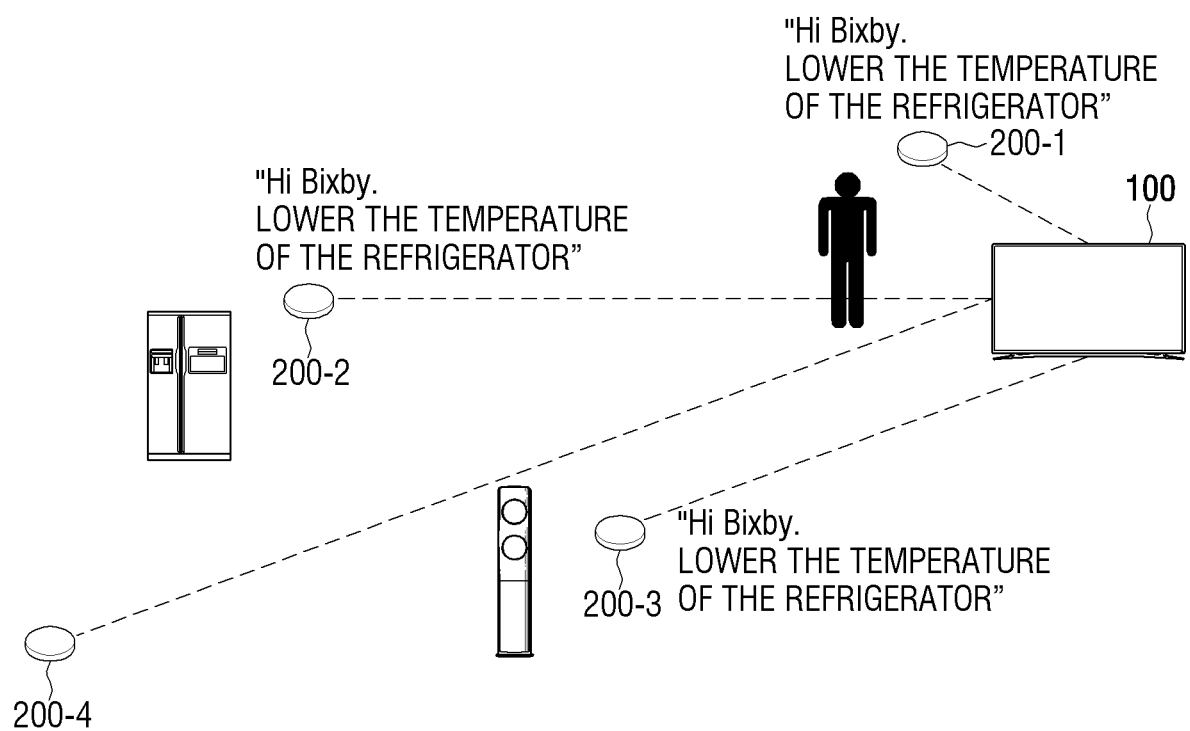
FIG. 3 is a diagram for describing a speech recognition method according to an embodiment of the disclosure.

The first to fourth sensor devices 200-1 to 200-4 may each include or may not include the wake-up module 221. Hereinafter, the case where the first to fourth sensor devices 200-1 to 200-4 do not include the wake-up module 221 will be described first. As illustrated in FIG. 3, an utterance "Hi Bixby, lower the temperature of the refrigerator" of the user may be input to the first to third sensor devices 200-1 to 200-3 located in the vicinity of the user. However, the fourth sensor device 200-4 may not receive the utterance of the user due to a long distance to the user or a wall or other obstruction between the fourth sensor device 200-4 and the user. Alternatively, in the case where the fourth sensor device 200-4 receives the utterance of the user, but an audio volume of the utterance is lower than a threshold value, the fourth sensor device 200-4 may not transmit an audio signal to the electronic apparatus 100. Alternatively, the fourth sensor device 200-4 may transmit an audio signal to the electronic apparatus 100 even in the case where the fourth sensor device 200-4 receives the utterance of the user but the audio volume of the utterance is lower than the threshold value. Further, the electronic apparatus 100 may also ignore an audio signal of which an audio volume is lower than the threshold value.

The first to third sensor devices 200-1 to 200-3 to which the utterance "Hi Bixby, lower the temperature of the refrigerator" of the user is input may transmit, to the electronic apparatus 100, first to third audio signals corresponding to the utterance "Hi Bixby, lower the temperature of the refrigerator", respectively. Here, the first to third audio signals may be signals with time differences depending on an input time, a distance between the user and the sensor device, or the like.

The processor 120 may identify one of the first to third sensor devices 200-1 to 200-3 as the effective sensor device based on the first to third audio signals. As an example, the processor 120 may compare a signal of which an utterance point in time is earliest and a signal of which an utterance point in time is latest among the first to third audio signals to identify whether a difference between the utterance points in time is equal to or shorter than a threshold time. In the case where the difference between the utterance points in time exceeds the threshold time, the processor 120 may identify that the first to third audio signals are different from one another. Here, the first to third sensor devices 200-1 to 200-3 may each transmit, to the electronic apparatus 100, at least one of time information indicating speech activity of user speech, or time information indicating the end points of the user speech in addition to the audio signal. In addition, the processor 120 may identify an utterance point in time of the audio signal based on the received information.

However, the disclosure is not limited thereto, the processor 120 may also use a reception point in time of the audio signal. For example, the processor 120 may compare a reception point in time of a signal input first among the first to third audio signals and a reception point in time of each of the remaining signals to identify whether a difference between the reception points in time is equal to or shorter than a threshold time. In the case where the difference between the reception points in time exceeds the threshold time, the processor 120 may identify that the first to third audio signals are different from one another.

In the case where the difference between the utterance points in time or the reception points in time is equal to or shorter than the threshold time, the processor 120 may identify similarity between audio signals. In the case where the similarity is lower than a threshold value, the processor 120 may identify that the first to third audio signals are different from one another.

Here, the processor 120 may identify similarity between audio signals by performing a comparison with respect to an entire input audio signal. For example, in the case where a first audio signal and a second audio signal corresponding to an utterance of "Hi Bixby, turn on the air conditioner" of the user are received from the first sensor device 200-1 and the second sensor device 200-3, respectively, the processor 120 may identify similarity by performing a comparison with respect to the entire first audio signal and the entire second audio signal.

Here, the disclosure is not limited thereto, and the processor 120 may also identify similarity between audio signals by performing a comparison only with respect to part of an input audio signal. For example, in the case where the first audio signal and the second audio signal corresponding to the utterance of "Hi Bixby, turn on the air conditioner" of the user are received from the first sensor device 200-1 and the second sensor device 200-2, respectively, the processor 120 may identify similarity by performing a comparison only with respect to a signal corresponding to the utterance "Hi Bixby" in the first audio signal and a signal corresponding to the utterance "Hi Bixby" in the second audio signal. That is, the processor 120 may identify the effective sensor device by performing a comparison only with respect to part of the first audio signal and part of the second audio signal that are received. Here, the part of the first audio signal and the part of the second audio signal may be determined by a predetermined time.

In the case where the similarity between the audio signals is equal to or higher than the threshold value, the processor 120 may identify one of the first to third sensor devices 200-1 to 200-3 as the effective sensor device by converting audio components of the first to third audio signals. Here, the processor 120 may convert audio components included the first to third audio signals by using the audio model as in FIG. 4 according to an embodiment of the disclosure.

Referring to FIG. 4, an example of an audio model is provided. In the illustrated audio model, Mode 1 may indicate a state in which the refrigerator is turned on and the air conditioner is operated in a turbo mode. Here, volumes of audio input to the first to third sensor devices 200-1 to 200-3 disposed in the vicinity of the TV, the refrigerator, and the air conditioner, respectively, may be 60, 20, and 30, respectively. Mode 2 may indicate a state in which a volume of the TV is lowered, the refrigerator is turned on, and the air conditioner is operated in a normal mode. Here, volumes of audio input to the first to third sensor devices 200-1 to 200-3 may be 30, 20, and 20, respectively. Mode 3 may indicate a state in which the refrigerator is turned on and the air conditioner is turned off. Here, volumes of audio input to the first to third sensor devices 200-1 to 200-3 may be 60, 20, and 10, respectively.

As described above, the audio model may include a plurality of modes based on operation states of the electronic apparatus and at least one other electronic apparatus, and volumes of audio input to the sensor devices in each of the plurality of modes. Here, the volume of audio may include only a noise component without user speech. In FIG. 4, a volume of audio input to the fourth sensor device 200-4 that is not disposed in the vicinity of the electronic apparatus 100 or at least one other electronic apparatus is not illustrated for convenience of explanation, but the audio model may also include the volume of audio input to the fourth sensor device 200-4.

The processor 120 may identify a speech component and a noise component in each of the first to third audio signals. For example, the processor 120 may identify a speech component of 65 and a noise component of 60 in the first audio signal, identify a speech component of 30 and a noise component of 20 in the second audio signal, and identify a speech component of 40 and a noise component of 30 in the third audio signal as illustrated in FIG. 5 according to an embodiment of the disclosure.

The processor 120 may identify a speech component and a noise component included in an audio signal based on the audio model as in FIG. 4. As an example, the processor 120 may learn and store an audio signal without a user utterance as the audio model as illustrated in FIG. 4, and identify a speech component and a noise component included in an audio signal based on the audio model when there is user speech.

Further, the processor 120 may perform noise reduction to significantly reduce an identification error of the effective sensor device according to an operation state of an electronic apparatus located adjacent to each of the sensor devices transmitting the audio signals. For example, the processor 120 may acquire a first predicted audio component, a second predicted audio component, and a third predicted audio component from a noise component included in the first audio signal, a noise component included in the second audio signal, and a noise component included in the third audio signal, respectively, according to the operation state of the electronic apparatus located adjacent to each of the sensor devices transmitting the audio signals, acquire a first quality characteristic of the first audio signal, a second quality characteristic of the second audio signal, and a third quality characteristic of the third audio signal based on a magnitude of the first predicted audio component, a magnitude of the second predicted audio component, and a magnitude of the third predicted audio component, respectively, and identify one of the first sensor device 200-1, the second sensor device 200-2, or the third sensor device 200-3 as the effective sensor device based on the first quality characteristic, the second quality characteristic, and the third quality characteristic.

More specifically, the processor 120 may identify the effective sensor device by using an SNR characteristic of the quality characteristic of each of the first to third audio signals. Here, in the case of acquiring the SNR characteristic without the noise reduction, the second sensor device 200-2 with the most preferable SNR characteristic before the noise reduction in an example illustrated in FIG. 5 may be identified as the effective sensor device. As an example, the SNR characteristic of the first audio signal is deteriorated due to the noise of the electronic apparatus 100 such as the TV, and in this case, the processor 120 identifies the second sensor device 200-2 as the effective sensor device, which is erroneous.

The processor 120 may perform the noise reduction by using the audio model. In the case where a volume of, for example, the TV is lowered in a state in which the TV is turned on, the processor 120 may identify that the noise is reduced from 60 to 30 as illustrated in FIG. 4. Further, the processor 120 may maintain the speech component of 65 and lower the noise component of 60 to 30 in the first audio signal as illustrated in FIG. 5. The processor 120 may perform such an operation with respect to the remaining audio signals as well, and acquire the SNR characteristic by using the reduced noise. Further, the processor 120 may identify the first sensor device 200-1 with the most preferable SNR characteristic as the effective sensor device. As described above, it is possible to prevent an identification error by the noise reduction.

The processor 120 may perform speech recognition only with respect to "Hi Bixby, lower the temperature of the refrigerator" which corresponds to the first audio signal received from the first sensor device 200-1 identified as the effective sensor device. Further, the processor 120 may perform speech recognition only with respect to an audio signal additionally received from the first sensor device 200-1 within a threshold time from when the first sensor device 200-1 is identified as the effective sensor device.

The processor 120 may control the refrigerator to lower a temperature of the refrigerator based on a speech recognition result. Further, the processor 120 may transmit a notification message notifying a refrigerator control result to the first sensor device 200-1 and the first sensor device 200-1 may provide the control result to the user.

Figure 6:
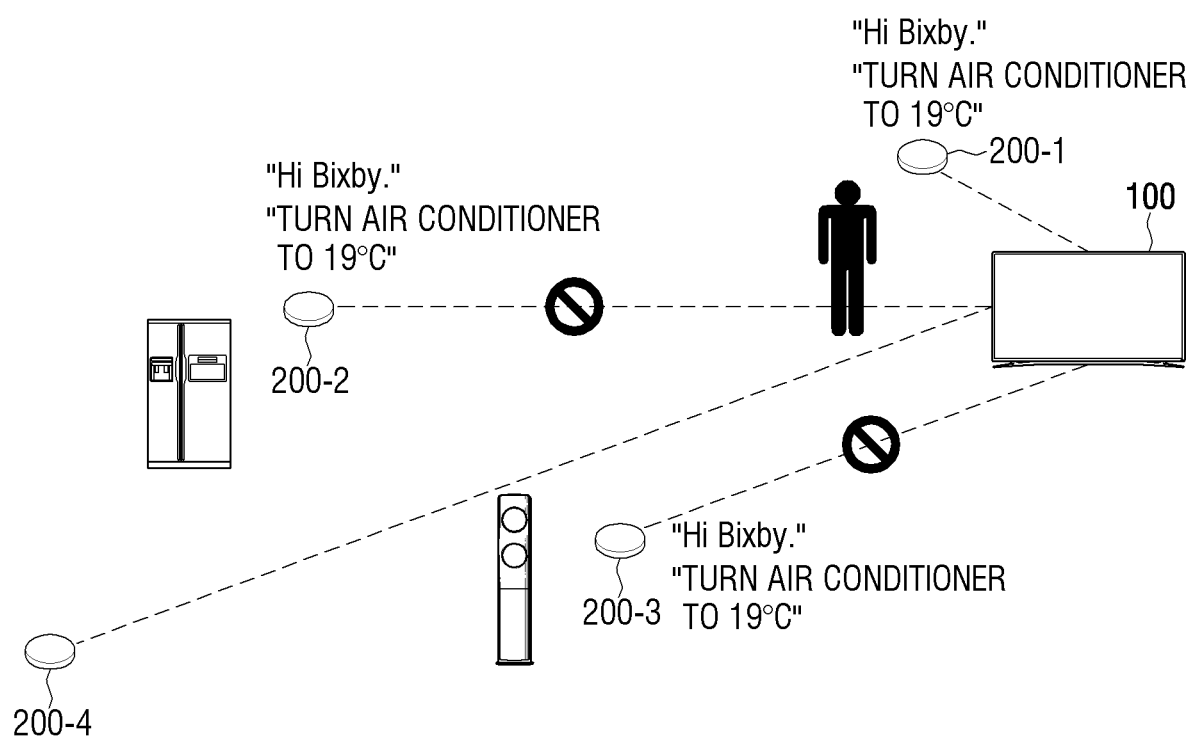
FIG. 6 is a diagram for describing a speech recognition method according to the embodiment of the disclosure.

The first to fourth sensor devices 200-1 to 200-4 may each include the wake-up module 221. Referring to FIG. 6, the utterance "Hi Bixby" of the user may be input to the first to third sensor devices 200-1 to 200-3 located in the vicinity of the user. However, the fourth sensor device 200-4 may not receive the utterance of the user due to a long distance to the user or a wall or other obstruction between the fourth sensor device 200-4 and the user.

The first to third sensor devices 200-1 to 200-3 to which the utterance "Hi Bixby" of the user is input may determine that a trigger signal is input, and the standby mode of each of the first to third sensor devices 200-1 to 200-3 may be released during the threshold time. Once an additional utterance is input from the user within the threshold time, the first to third sensor devices 200-1 to 200-3 may transmit, to the electronic apparatus 100, first to third additional audio signals, respectively. Here, the first to third additional audio signals, which are signals corresponding to the additional utterance, may be signals with time differences depending on an input time, a distance between the user and the sensor device, or the like.

Referring to FIG. 6, an additional utterance "Turn the air conditioner to 19° C." of the user may be input to the first to third sensor devices 200-1 to 200-3 located in the vicinity of the user. The first to third sensor devices 200-1 to 200-3 may transmit, to the electronic apparatus 100, the first to third additional audio signals, respectively.

The processor 120 may identify the effective sensor device based on the first to third additional audio signals, and a specific method therefor is the same as that in the case of not including the wake-up module 221 described above.

The processor 120 may perform speech recognition only with respect to the first additional audio signal in the case where the first sensor device 200-1 is identified as the effective sensor device. The processor 120 may be operated as described above during the threshold time from when the effective sensor device is identified. As an example, the processor 120 may ignore an audio signal received from another sensor device after the first sensor device 200-1 is identified as the effective sensor device. Alternatively, the processor 120 may transmit, to another sensor device, a control instruction to inhibit transmission of an audio signal during the threshold time after the first sensor device 200-1 is identified as the effective sensor device.

The processor 120 may control the air conditioner to be operated at 19° C. based on a speech recognition result. Further, the processor 120 may transmit a notification message notifying an air conditioner control result to the first sensor device 200-1 and the first sensor device 200-1 may provide the control result to the user.

Figure 7A:
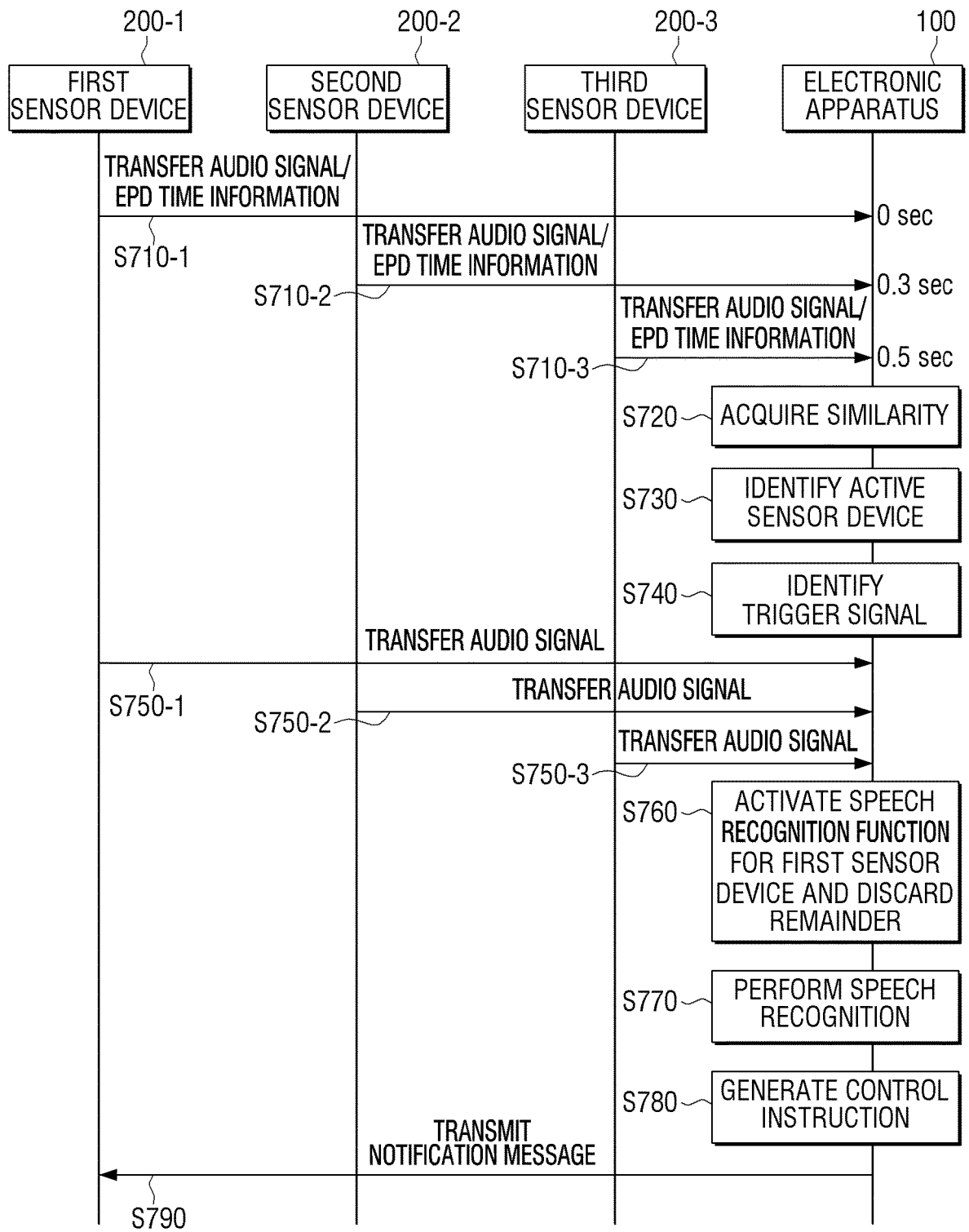
FIG. 7A is a sequence diagram for describing operations of an electronic system according to an embodiment of the disclosure.

FIG. 7A is a sequence diagram for describing operations of an electronic system according to an embodiment of the disclosure.

Referring to FIG. 7A, once user speech is input, the first to third sensor devices 200-1 to 200-3 may transmit, to the electronic apparatus 100, the first to third audio signals, respectively. At this time, the first to third sensor devices 200-1 to 200-3 may further transmit, to the electronic apparatus 100, EPD time information in operations S710-1, S710-2, and S710-3, respectively. Here, the first to third sensor devices 200-1 to 200-3 may each acquire the EPD time information from the input user speech. Alternatively, the electronic apparatus 100 may receive the first to third audio signals and acquire a time at which an audio signal is first received and the EPD time information based on the received audio signals. The EPD time information may include time information indicating the end points of the user speech. Here, the time information indicating the end points of the user speech may include a user speech start point.

However, the disclosure is not limited thereto and the first to third sensor devices 200-1 to 200-3 may further transmit, to the electronic apparatus 100, VAD time information. The VAD time information may include time information indicating speech activity of the user speech. Alternatively, the electronic apparatus 100 may record at least one of the EPD time information or the VAD time information.

The electronic apparatus 100 may identify whether the plurality of audio signals are input within a threshold time based on at least one of the EPD time information or the VAD time information. As an example, the electronic apparatus 100 may identify a difference between utterance points in time of the user speech based on at least one of the EPD time information or the VAD time information and determine whether to identify similarity between the audio signals based on the difference between the utterance points in time. For example, the electronic apparatus 100 may identify similarity between the first audio signal and the second audio signal, but may not identify similarity between the first audio signal and the third audio signal.

The electronic apparatus 100 may acquire similarity in operation S720 and identify the effective sensor device in operation S730. As an example, the electronic apparatus 100 may acquire similarity in operation S720 and select the effective sensor device based on a quality of a predicted audio component in operation S730. Here, the predicted audio component may include an audio component with a reduced noise component. Hereinafter, a case where the first sensor device 200-1 is the effective sensor device will be described.

The electronic apparatus 100 may identify whether the received audio signal is a trigger signal in operation S740. In the case where it is identified that the received audio signal is a trigger signal, the electronic apparatus 100 may perform speech recognition with respect to an additional audio signal received from the effective sensor device. Alternatively, in the case where it is identified that the received audio signal is not a trigger signal, the electronic apparatus 100 may not perform speech recognition even in the case where an additional audio signal is received from the effective sensor device.

However, the disclosure is not limited thereto, and the first sensor device 200-1, the second sensor device 200-2, and the third sensor device 200-3 may directly identify the trigger word. In this case, the electronic apparatus 100 may not perform an operation of identifying the trigger word.

Once the trigger signal is identified, the electronic apparatus 100 may control operation states of the electronic apparatus 100 and at least one other electronic apparatus. For example, the electronic apparatus 100 may significantly reduce a noise component of the additional audio signal by lowering a volume of the TV or muting the TV, and changing the turbo mode (power mode) of the air conditioner to the normal mode.

Alternatively, the electronic apparatus 100 may control an operation state of at least one of the electronic apparatus 100 or at least one other electronic apparatus. For example, the electronic apparatus 100 may only lower the volume of the TV while not controlling the air conditioner or the vacuum cleaner at the same time.

Here, the electronic apparatus 100 may also control an operation state of only one of the electronic apparatus 100 or at least one other electronic apparatus, the one being located adjacent to the effective sensor device. Alternatively, the electronic apparatus 100 may control an operation state of only one of the electronic apparatus 100 or at least one other electronic apparatus, the one producing loud noise.

The electronic apparatus 100 may restore a changed operation state of the electronic apparatus to an original operation state. For example, the electronic apparatus 100 may stop operation of the vacuum cleaner and control the vacuum cleaner to operate again.

The electronic apparatus 100 may restore the operation states of the electronic apparatus 100 and at least one other electronic apparatus after a predetermined time elapses from when the operation states of the electronic apparatus 100 and at least one other electronic apparatus are changed. For example, the electronic apparatus 100 may control the vacuum cleaner to operate again after two seconds elapse from when the operation of the vacuum cleaner is stopped.

Alternatively, the electronic apparatus 100 may restore the operation states of the electronic apparatus 100 and at least one other electronic apparatus after the effective sensor device is identified and an additional audio signal is received in operations in S750-1, S750-2, and S750-3, as described later. Alternatively, the electronic apparatus 100 may restore the operation states of the electronic apparatus 100 and at least one other electronic apparatus after a speech recognition function for the first sensor device 200-1 is activated in operation in S760, as described later. Alternatively, the electronic apparatus 100 may restore the operation states of the electronic apparatus 100 and at least one other electronic apparatus after speech recognition with respect to the additional audio signal is performed in operation in S770, as described later. Alternatively, the electronic apparatus 100 may restore the operation states of the electronic apparatus 100 and at least one other electronic apparatus after generating a control instruction based on a speech recognition result in operation in S780, as described later. Alternatively, the electronic apparatus 100 may restore the operation states of the electronic apparatus 100 and at least one other electronic apparatus after transmitting, to the effective sensor device, a notification message notifying a control result in operation in S790, as described later.

The first to third sensor devices 200-1 to 200-3 may transmit, to the electronic apparatus 100, first to third additional audio signals, respectively, according to an additional utterance of the user. Once the first to third additional audio signals are received in a state in which the trigger signal is received, the electronic apparatus 100 may activate the speech recognition function for the first sensor device 200-1 in operation S760, and perform speech recognition with respect to the first additional audio signal in operation S770. At the same time, the processor 120 may not perform speech recognition with respect to the second additional audio signal and the third additional audio signal.

The electronic apparatus 100 may generate a control instruction based on a speech recognition result in operation S780 and transmit, to the effective sensor device, a notification message notifying a control result in operation S790.

However, the disclosure is not limited thereto, and the electronic apparatus 100 may also transmit a message notifying a control result to a sensor device located adjacent to the user, or another electronic apparatus. For example, in the case where the user is located in the vicinity of the effective sensor device at a point in time at which the user utters the user speech, and the user moves to be located in the vicinity of another sensor device, the electronic apparatus 100 may transmit a notification message notifying a control result to the another sensor device.

Here, the electronic apparatus 100 may acquire user location information by using the sensor devices, another electronic apparatus, and the like. For example, the sensor devices, another electronic apparatus, and the like may detect whether the user is present therearound by using an infrared sensor, a temperature sensor, or the like, and transmit detection information to the electronic apparatus 100. Alternatively, the sensor devices or another electronic apparatus may include a camera and transmit an image captured by the camera to the electronic apparatus 100, and the electronic apparatus 100 may perform user recognition by using the received image to acquire user location information.

Figure 7B:
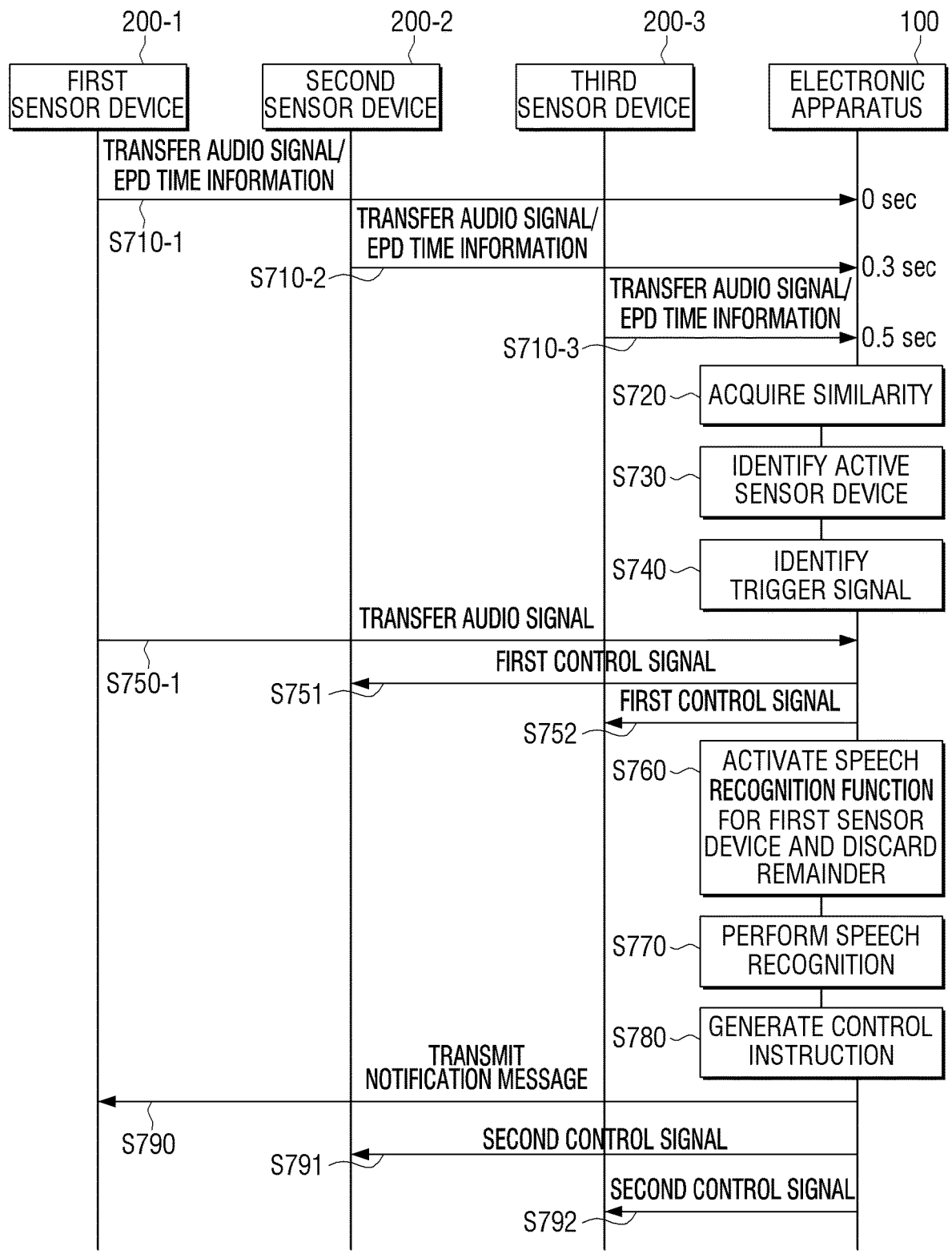
FIG. 7B is a sequence diagram for describing operations of an electronic system according to another embodiment of the disclosure.

FIG. 7B is a sequence diagram for describing operations of an electronic system according to another embodiment of the disclosure. Overall operations in FIG. 7B are the same as those in FIG. 7A, and thus only a difference will be described.

Referring to FIG. 7B, once the effective sensor device is identified, the electronic apparatus 100 may transmit a first control signal to the remaining sensor devices other than the effective sensor device in operations S751 and S752. Here, the first control signal may be a signal for inhibiting transmission of an audio signal during the threshold time. As an example, once the first control signal is received from the electronic apparatus 100, the second sensor device 200-2 and the third sensor device 200-3 do not transmit, to the electronic apparatus 100, an audio signal corresponding to user speech even if the user speech is input during the threshold time. As an example, the electronic apparatus 100 may receive an audio signal only from the first sensor device 200-1 and perform speech recognition and a control operation.

Alternatively, the second sensor device 200-2 and the third sensor device 200-3 may be operated in the standby mode again, once the first control signal is received from the electronic apparatus 100. In this case, the second sensor device 200-2 and the third sensor device 200-3 do not transmit, to the electronic apparatus 100, the audio signal, until the trigger signal is received.

The electronic apparatus 100 may perform speech recognition and a control operation based on the audio signal received from the first sensor device 200-1, transmit the notification message to the first sensor device 200-1 in operation S790, and transmit a second control signal to the second sensor device 200-2 and the third sensor device 200-3 in operations S791 and S792, respectively. The second control signal may be a signal for releasing inhibition of audio signal transmission. As an example, once the second control signal is received from the electronic apparatus 100, the second sensor device 200-2 and the third sensor device 200-3 may release the inhibition of the audio signal transmission, and once user speech is input, the second sensor device 200-2 and the third sensor device 200-3 may transmit an audio signal corresponding to the user speech.

Figure 8:
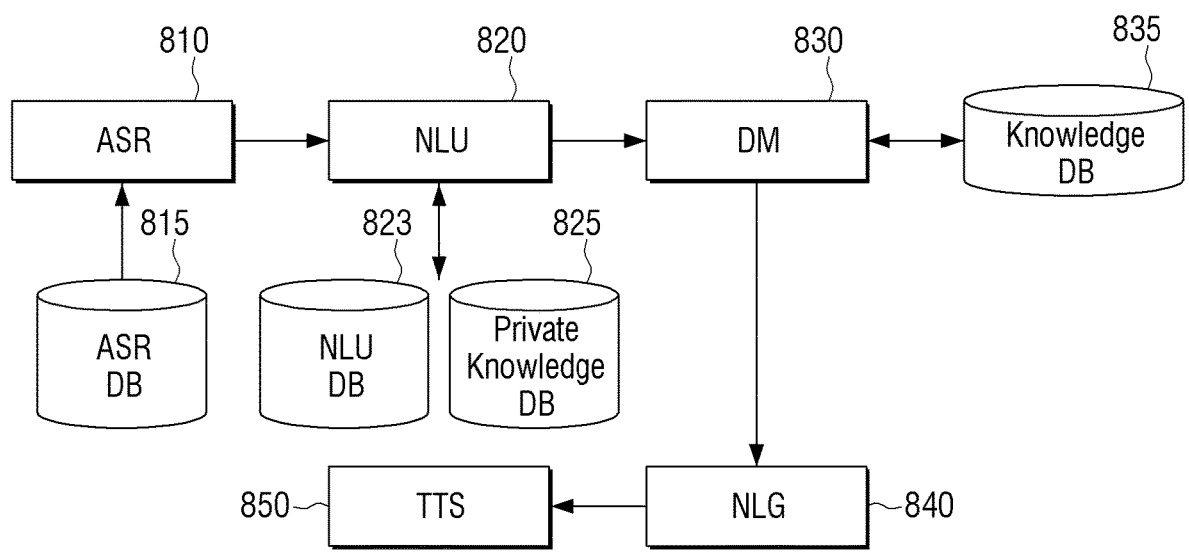
FIG. 8 is a block diagram for describing a dialogue system according to an embodiment of the disclosure.

FIG. 8 is a block diagram for describing a dialogue system according to an embodiment of the disclosure.

Referring to FIG. 8, the dialogue system 800 is a component for performing dialogue with a virtual artificial intelligence agent by using a natural language. According to an embodiment of the disclosure, the dialogue system 800 may be stored in the memory 130 of the electronic apparatus 100. However, this is only an example, at least one included in the dialogue system 800 may also be included in at least one external server.

As illustrated in FIG. 8, the dialogue system 800 may include an ASR module 810, a natural language understanding (NLU) module 820, a dialogue manager (DM) module 830, a natural language generator (NLG) module 840, and a text to speech (TTS) module 850. In addition, the dialogue system 800 may further include a path planner module or an action planner module.

The ASR module 810 may convert an audio signal (e.g., a user inquiry) received from the sensor device into text data. For example, the ASR module 810 may include an utterance recognition module. The utterance recognition module may include an acoustic model and a language model. The acoustic model may include information regarding a vocalization and the language model may include information regarding unit phoneme information and a combination of the unit phoneme information. The utterance recognition module may convert a user utterance into text data by using the information regarding a vocalization and the information regarding unit phoneme information. Information regarding the acoustic model and the language model may be stored in an automatic speech recognition database (ASR DB) 815.

The NLU module 820 may perform syntactic analysis or semantic analysis to understand intent of the user. The syntactic analysis may be performed in a manner in which user speech is divided into syntactic units (e.g. words, phrases, or morphemes), and a syntactic element that the syntactic unit has is identified. The semantic analysis may be performed by using semantic matching, rule matching, formula matching, and the like. Accordingly, the NLU module 820 may acquire a domain, intent, or a parameter (or slot) required to express intent.

The NLU module 820 may determine intent of the user and a parameter by using a matching rule divided into the domain, the intent, and the parameter (or slot) required to understand the intent. For example, one domain (for example, channel) may include a plurality of intent (for example, channel up, channel down, or channel change), and one intent may include a plurality of parameters (for example, channel change interval). A plurality of rules may include, for example, one or more essential parameters. The matching rule may be stored in a natural language understanding database (NLU DB) 823.

In the case where an utterance "turn on the air conditioner" is analyzed in the NLU module 820, the processor 120 may require location information because there may be a plurality of controllable air conditioners. In this case, the processor 120 may transmit, to the effective sensor device, a message requesting specification of an air conditioner. Alternatively, the processor 120 may control one of the plurality of air conditioners based on a location of the effective sensor device. Alternatively, the processor 120 may control one of the plurality of air conditioners based on a location of the user. At this time, in the case where the location of the user is continuously changed, the processor 120 may control another air conditioner rather than an air conditioner located adjacent to the effective sensor device.

The NLU module 820 may understand a meaning of a word extracted from user speech by using a linguistic feature (for example, syntactic element) such as a morpheme or a phrase, and determine intent of the user by matching the understood meaning of the word to a domain and intent. For example, the NLU module 820 may calculate the number of words included in each domain and intent to determine intent of the user, the words being extracted from user speech. According to an embodiment, the NLU module 820 may determine a parameter of user speech by using a word used to understand intent. According to an embodiment, the NLU module 820 may determine intent of the user by using the NLU DB 823 in which a linguistic feature for understanding intent of user speech is stored.

The NLU module 820 may understand user speech by using a private knowledge DB 825. The private knowledge DB 825 may learn a relationship between knowledge information based on at least one of a user interaction input to the electronic apparatus 100, a search history of the user, sensing information sensed by the electronic apparatus 100, or user speech received from the sensor device. At this time, the private knowledge DB 825 may store the relationship between knowledge information in a form of ontology.

In the case where new knowledge information is added, the private knowledge DB 825 may receive additional information of the new knowledge information from an external server and store the knowledge information and the additional information in a form of ontology. Storing the knowledge information in a form of ontology in the private knowledge DB 825 is only an example. The information may also be stored in a form of a dataset.

The NLU module 820 may determine intent of the user by using the private knowledge DB 825. For example, the NLU module 820 may determine intent of the user by using user information (for example, control device distribution and control function distribution). According to an embodiment, in addition to the NLU module 820, the ASR module 810 may also recognize user speech by referring to the private knowledge DB 825.

The NLU module 820 may generate a path rule based on intent of user speech, and a parameter. For example, the NLU module 820 may select an electronic apparatus based on intent of user speech and determine an operation to be performed in the selected electronic apparatus. The NLU module 820 may generate a path rule by determining a parameter corresponding to the determined operation. According to an embodiment, the path rule generated by the NLU module 820 may include information regarding an electronic apparatus, an operation to be performed in the electronic apparatus, and a parameter required to perform the operation.

The NLU module 820 may generate one path rule or a plurality of path rules based on intent of user speech, and a parameter. For example, the NLU module 820 may receive a path rule set corresponding to the electronic apparatus 100 from the path planner module, and determine a path rule by mapping the intent of the user speech and the parameter to the received path rule set. Here, the path rule may include information regarding an operation for performing a function, or information regarding a parameter required to perform the operation. In addition, the path rule may include a function operating sequence. The electronic apparatus may receive the path rule, select an electronic apparatus according to the path rule, and allow the operation included in the path rule to be performed in the selected electronic apparatus.

The NLU module 820 may generate one path rule or a plurality of path rules by determining an electronic apparatus, an operation to be performed in the electronic apparatus, and a parameter required to perform the operation, based on intent of user speech, and a parameter. For example, the NLU module 820 may generate a path rule by arranging an electronic apparatus and an operation to be performed in the electronic apparatus in a form of ontology or a graph model according to intent of user speech by using information of the electronic apparatus 100. For example, the generated path rule may be stored in a path rule database through the path planner module. The generated path rule may be added to a path rule set of the NLU DB 823.

The NLU module 820 may select at least one path rule among a plurality of generated path rules. For example, the NLU module 820 may select an optimum path rule among the plurality of path rules. As another example, the NLU module 820 may select a plurality of path rules in the case where only some operations are specified based on user speech. The NLU module 820 may determine one path rule among a plurality of path rules according to an additional input from the user.

The DM module 830 may determine whether intent of the user understood by the NLU module 820 is clear. For example, the DM module 830 may determine whether intent of the user is clear based on whether information regarding the parameter is sufficient. The DM module 830 may determine whether the parameter acquired by the NLU module 820 is sufficient to perform a task. According to an embodiment, the DM module 830 may perform feedback to request necessary information to the user in the case where intent of the user is not clear. For example, the DM module 830 may perform feedback to request information regarding a parameter for understanding the intent of the user.

According to an embodiment, the DM module 830 may include a content provider module. The content provider module may generate a result of performing a task corresponding to user speech in the case where an operation may be performed based on intent and a parameter acquired by the NLU module 820.

According to another embodiment, the DM module 830 may provide a response on user speech by using a knowledge DB 835. Here, the knowledge DB 835 may be included in the electronic apparatus 100. However, this is only an example, and the knowledge DB 835 may be included in an external server.

The NLG module 840 may change designated information to have a text form. The information changed to have a text form may have a form of a natural language utterance. The designated information may be, for example, information regarding an additional input, information notifying completion of an operation corresponding to user speech, or information (for example, feedback information with respect to user speech) notifying an additional input from the user. The information changed to have a text form may be displayed on a display of the electronic apparatus 100 or may be changed to have a speech form by the TTS module 850.

The TTS module 850 may change information in a text form to information in a speech form. The TTS module 850 may receive information in a text form from the NLG module 840, change the information in a text form to information in a speech form, and output the information in a speech form.

The ASR module 810 may be implemented by the speech recognition module 133 in FIG. 2D, and the NLU module 820, the DM module 830, the NLG module 840, and the TTS module 850 may be implemented by the task module 134 in FIG. 2D.

Figure 9A:
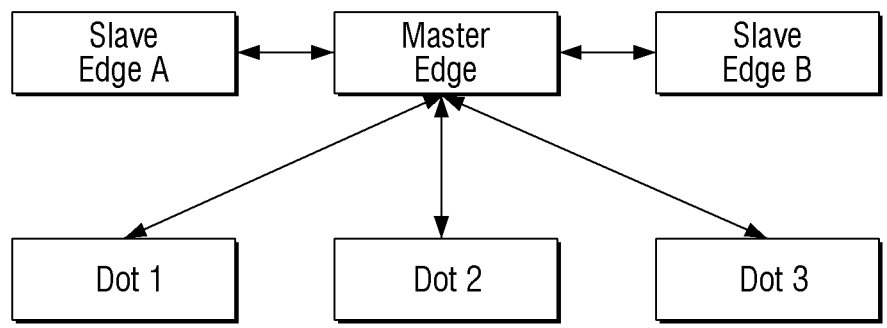
FIGS. 9A, 9B, and 9C are diagrams for describing an expanded example according to an embodiment of the disclosure.
Figure 9B:
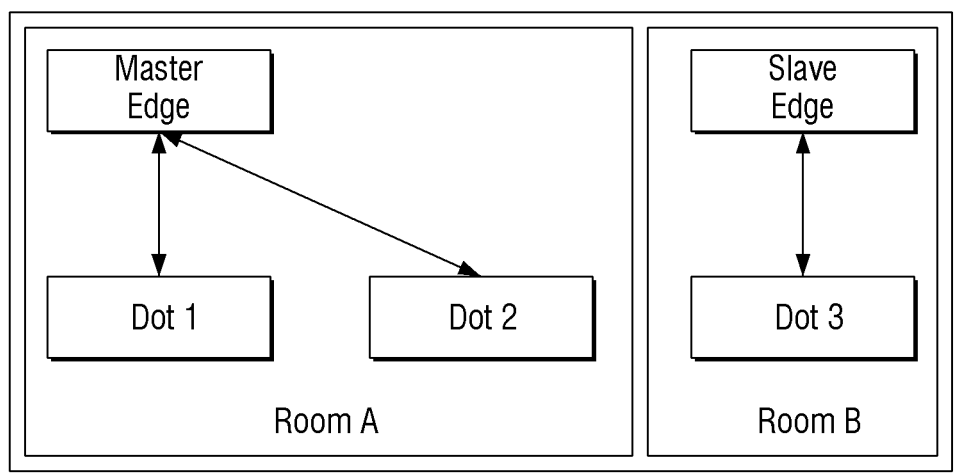
Figure 9C:
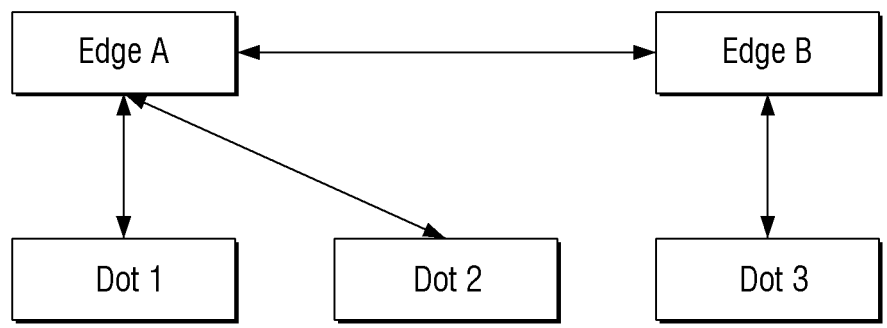

FIGS. 9A, 9B, and 9C are diagrams for describing an expanded example according to an embodiment of the disclosure.

Referring to FIG. 9A, the electronic system 1000 may include a plurality of electronic apparatuses (Master Edge, Slave Edge A, and Slave Edge B), rather than one electronic apparatus (Master Edge) 100. Here, all of the plurality of electronic apparatuses (Master Edge, Slave Edge A, and Slave Edge B) may be apparatuses managing a plurality of sensor devices (Dot 1, Dot 2, and Dot 3). For example, Master Edge may receive audio signal from the plurality of sensor devices (Dot 1, Dot 2, and Dot 3), control Slave Edge A to perform identification of the effective sensor device, and control Slave Edge B to perform speech recognition. As an example, Master Edge may control Slave Edge A and Slave Edge B to perform distributed processing of the operations of the electronic apparatus 100 described with reference to FIGS. 1, 2, 3, 4, 5, 6, 7 and 8.

Alternatively, referring to FIG. 9B, the electronic system 1000 may include a plurality of electronic apparatuses (Master Edge and Slave Edge). Master Edge manages two sensor devices (Dot 1 and Dot 2) in Room A, Slave Edge manages one sensor device (Dot 3) in Room B, and here, the sensor device managed by Master Edge and the sensor device managed by Slave Edge may be different from each other. Further, Master Edge and Slave Edge are operated separately, and may manage only a sensor device allocated thereto. However, in a situation in which Master Edge and Slave Edge need to be operated in cooperation with each other, for example, in the case of analyzing a use pattern of the user during a predetermined period, Master Edge may be prioritized higher than Slave Edge.

Alternatively, in the case where Master Edge receives audio signals from the plurality of sensor devices (Dot 1 and Dot 2), Master Edge requests Slave Edge for an audio signal received by Slave Edge, and in the case where there is an audio signal received by Slave Edge, the audio signal is transmitted to Master Edge, and Master Edge may perform comparison with respect to the audio signals.

Alternatively, referring to FIG. 9C, the electronic system 1000 may include a plurality of electronic apparatuses (Edge A and Edge B) corresponding to each other, rather than one electronic apparatus (Master Edge) 100. Edge A manages two sensor devices (Dot 1 and Dot 2), Edge B manages one sensor device (Dot 3), and here, the sensor devices managed by Edge A and Edge B may be different from each other. Further, Edge A and Edge B may perform communication with each other and share data. For example, even in the case where all of three sensor devices receive user speech when the user utters the user speech, Edge A and Edge B may identify only one of the three sensor devices as the effective sensor device. Further, Edge A and Edge B may each be operated as Master Edge or Slave Edge by setting priority. As an example, once an audio signal is received, Edge A and Edge B need to perform an operation of broadcasting the audio signal and checking whether the audio signal is received by another Edge until priority is set.

Although FIGS. 9A, 9B, and 9C illustrate the case where a plurality of Edges and a plurality of Dots are implemented in three types and a Dot is operated in cooperation with a corresponding Edge, the disclosure is not limited thereto. For example, a correspondence between an Edge and a Dot is not established, and once user speech is input, a Dot may identify an Edge adjacent thereto through broadcasting and transmit an audio signal to the adjacent Edge. Alternatively, once user speech is input, the Dot may transmit a signal to a plurality of Edges through broadcasting, the plurality of Edges may perform comparison once more, and one of the plurality of Edges may perform speech recognition.

Figure 10A:
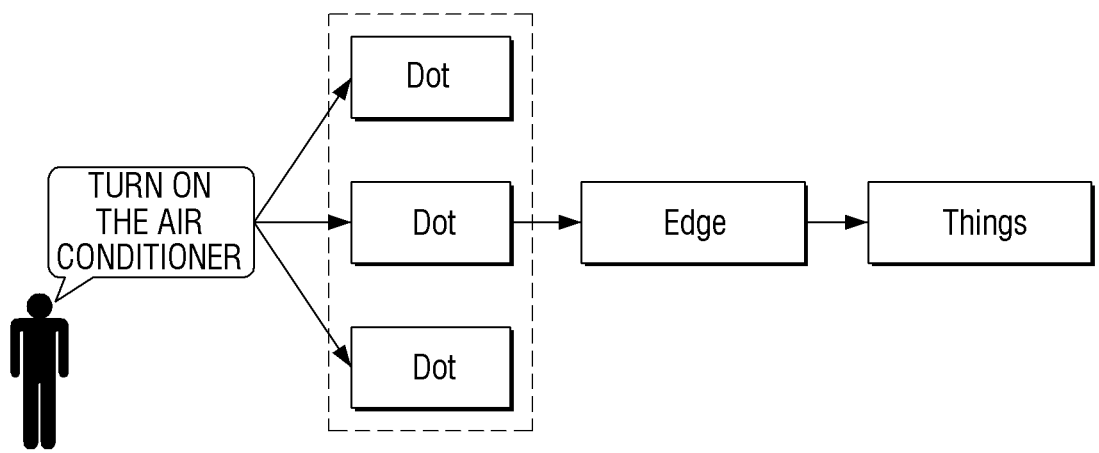
FIGS. 10A and 10B are diagrams for describing priority set for devices according to various embodiments of the disclosure.
Figure 10B:
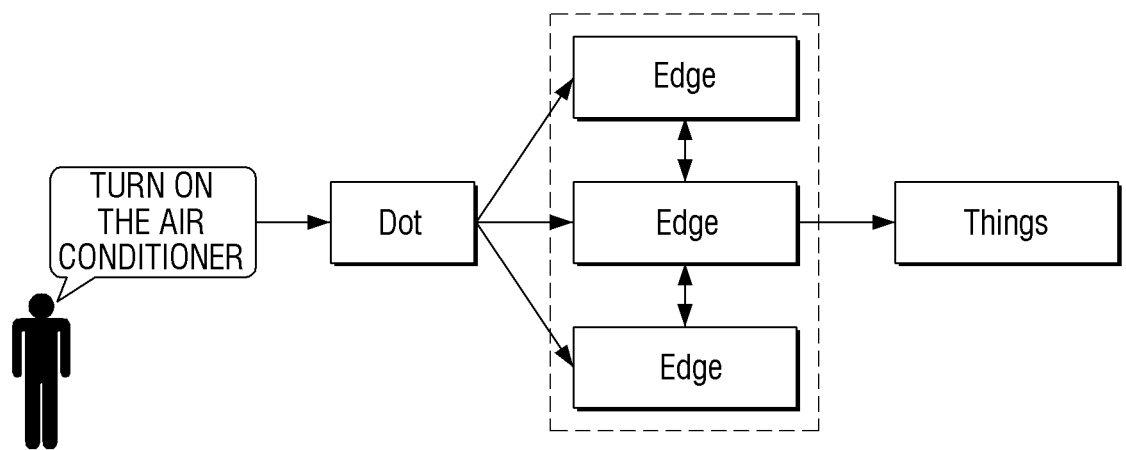

FIGS. 10A and 10B are diagrams for describing priority set for devices according to various embodiments of the disclosure.

Referring to FIG. 10A, a plurality of sensor devices (Dots) may predict a quality of user speech to be input and only one sensor device may transmit an audio signal to an electronic apparatus (Edge). Here, the plurality of sensor devices (Dots) may each consider a state change of an ambient sensor device.

For example, in the case where user speech "Turn on the air conditioner" is received, a sensor device located adjacent to the air conditioner may transmit an audio signal to the electronic apparatus.

Referring to FIG. 10B, the sensor device (Dot) may transmit an audio signal corresponding to input user speech to Master Edge with the highest priority among a plurality of electronic apparatuses (Edges). In the case where no priority is set for each of the plurality of electronic apparatuses, the electronic apparatuses need to share a received audio signal or a signal indicating that an audio signal is received. However, in the case where priority is set for each of the plurality of electronic apparatuses, the above described unnecessary operation is not performed, which may result in improvement in efficiency.

Figure 11:
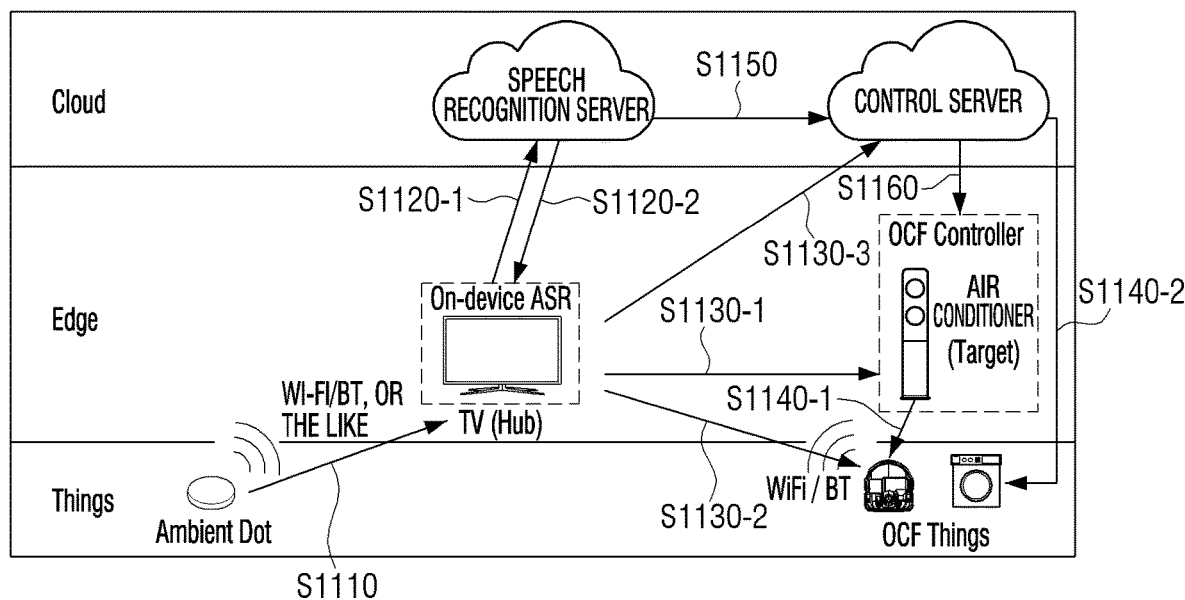
FIG. 11 is a diagram for describing a method of using a server according to an embodiment of the disclosure.

FIG. 11 is a diagram for describing a method of using a server according to an embodiment of the disclosure.

Referring to FIG. 11, once user speech is input to a sensor device (Dot), at least one of the EPD time information or the VAD time information may be acquired. The sensor device may transmit an audio signal corresponding to the user speech and the acquired time information to an electronic apparatus (Edge). For example, in the case where user speech "Turn on the vacuum cleaner" is input, the sensor device may transmit an audio signal corresponding to the user speech "Turn on the vacuum cleaner" and acquired time information to the electronic apparatus (Edge) in operation S1110

Alternatively, the sensor device may transmit only the audio signal corresponding to the input user speech to the electronic apparatus 100. In this case, the electronic apparatus 100 may acquire time information indicating speech activity of user speech through the VAD, and acquire time information indicating the end points of the user speech through the EPD. For example, in the case where user speech "Turn on the vacuum cleaner" is input, the sensor device may transmit an audio signal corresponding to the user speech "Turn on the vacuum cleaner" to the electronic apparatus (Edge), and the electronic apparatus may acquire at least one of time information indicating speech activity of the user speech, or time information indicating the end points of the user speech, from the audio signal.

The electronic apparatus may wake up and perform speech recognition, once the audio signal is input. Here, the speech recognition may be performed by a separate speech recognition server. As an example, the electronic apparatus may transmit the audio signal to the speech recognition server in operation S1120-1 and receive a speech recognition result from the speech recognition server in operation S1120-2.

According to another embodiment, in the case where a quality of an audio signal received by the electronic apparatus is low, or in the case where an accuracy of speech recognition performed with respect to the audio signal based on a speech model or a language model is low, it may be determined that a speech recognition processing result is not accurate. In this case, the electronic apparatus may transmit the audio signal to the speech recognition server with a greater computing capability and the speech recognition server may process the audio signal once more. In this case, the sensor device may also transmit the audio signal to the speech recognition server without going through the electronic apparatus.

Although FIG. 11 illustrates the case where the speech recognition server and a control server are separately implemented, this is only an example and various configurations may be implemented. For example, the speech recognition server and the control server may be implemented as one server. Further, both of the speech recognition server and the control server may also be implemented as cloud servers.

The electronic apparatus may transmit a control instruction to another electronic apparatus (Edge) requested by the user after the speech recognition in operation S1130-1. For example, in the case where the TV is Edge and receives user speech for controlling the vacuum cleaner, the TV may identify that communication between the TV and the vacuum cleaner may not be performed, identify another electronic apparatus (air conditioner) capable of performing communication with the vacuum cleaner, and transmit a control instruction for controlling the vacuum cleaner to the other electronic apparatus in operation S1130-1. The other electronic apparatus may control the vacuum cleaner based on the received control instruction in operation S1140-1.

Here, the TV may inquire of at least one other electronic apparatus about whether the at least one other electronic may control the vacuum cleaner, and transmit the control instruction for controlling the vacuum cleaner to another electronic apparatus responding thereto. However, such an information may be stored in the TV in advance.

Alternatively, in the case where the TV may perform communication with the vacuum cleaner, once user speech for controlling the vacuum cleaner is received, the TV may directly transmit a control command for controlling the vacuum cleaner to the vacuum cleaner in operation S1130-2.

However, the disclosure is not limited thereto. The electronic apparatus may transmit the control instruction to the control server in operation S1130-3 and the control server may transmit the control instruction to a control target apparatus in operation S1140-2. Alternatively, the speech recognition server may transmit a speech recognition result to the control server in operation S1150 and the control server may generate a control instruction corresponding to the speech recognition result and transmit the control instruction to another electronic apparatus in operation S1160.

FIG. 12 is a flowchart for describing a control method of an electronic apparatus according to an embodiment of the disclosure.

Referring to FIG. 12, a first audio signal and a second audio signal are received from a first sensor device and a second sensor device located away from the first sensor device, respectively in operation S1210. Further, similarity between the first audio signal and the second audio signal is acquired in operation S1220. Further, in the case where the similarity is equal to or higher than a threshold value, a first predicted audio component and a second predicted audio component are acquired from the first audio signal and the second audio signal, respectively, based on an operation state of each of an electronic apparatus located adjacent to the first sensor device and an electronic apparatus located adjacent to the second sensor device in operation S1230. One of the first sensor device or the second sensor device is identified as the effective sensor device based on the first predicted audio component and the second predicted audio component in operation S1240. Speech recognition is performed with respect to an additional audio signal received from the effective sensor device in operation S1250.

Here, the acquiring of the first predicted audio component and the second predicted audio component in operation S1230 includes identifying a mode corresponding to the operation state of the electronic apparatus located adjacent to the first sensor device and the operation state of the electronic apparatus located adjacent to the second sensor device based on a mode-specific audio model based on an operation state of each of the electronic apparatus and at least one electronic apparatus, and acquiring the first predicted audio component and the second predicted audio component from the first audio signal and the second audio signal, respectively, based on the identified mode, in which the audio model may be acquired, as each of a plurality of sensor devices learns audio acquired based on an operation state of an adjacent electronic apparatus, through an artificial intelligence algorithm.

Further, the acquiring of the first predicted audio component and the second predicted audio component includes acquiring the first predicted audio component and the second predicted audio component from a noise component included in the first audio signal and a noise component included in the second audio signal, respectively, based on the identified mode, and acquiring a first quality characteristic of the first audio signal and a second quality characteristic of the second audio signal based on a magnitude of the first predicted audio component and a magnitude of the second predicted audio component, respectively, in which in the identifying as the effective sensor device in operation S1240, one of the first sensor device or the second sensor device may be identified as the effective sensor device based on the first quality characteristic and the second quality characteristic.

The control method may further include changing the operation state of the electronic apparatus located adjacent to the first sensor device and the operation state of the electronic apparatus located adjacent to the second sensor device to allow the electronic apparatus located adjacent to the first sensor device and the electronic apparatus located adjacent to the second sensor device to be operated in a predetermined mode according to a predetermined event.

For example, the electronic apparatus may significantly reduce a noise component of the additional audio signal by lowering a volume of the TV or muting the TV, and changing the turbo mode of the air conditioner to the normal mode.

Alternatively, the electronic apparatus may control an operation state of at least one of the electronic apparatus or at least one other electronic apparatus. For example, the electronic apparatus may only lower the volume of the TV while not controlling the air conditioner or the vacuum cleaner at the same time.

Here, the electronic apparatus may also control an operation state of only one of the electronic apparatus or at least one other electronic apparatus, the one being located adjacent to the effective sensor device. Alternatively, the electronic apparatus may control an operation state of only one of the electronic apparatus or at least one other electronic apparatus, the one producing loud noise.

The control method may further include controlling at least one of the electronic apparatus or at least one other electronic apparatus based on a speech recognition result, and controlling the effective sensor device to provide a notification message notifying a control result.

In the acquiring of the similarity in operation S1220, the similarity may be acquired in the case where the second audio signal is received within a threshold time from when the first audio signal is received.

In contrast, the control method may further include identifying the first sensor device and the second sensor device as a first effective sensor device and a second effective sensor device, respectively, in the case where the second audio signal is received after the threshold time from when the first audio signal is received, or in the case where the similarity is lower than the threshold value, and performing speech recognition with respect to an additional audio signal received from each of the first effective sensor device and the second effective sensor device.

Further, the acquiring of the similarity in operation S1220 may include acquiring time domain similarity between the first audio signal and the second audio signal, acquiring frequency domain similarity between the first audio signal and the second audio signal, and acquiring the similarity based on at least one of the time domain similarity or the frequency domain similarity.

The control method may further include ignoring, once one of the first sensor device or the second sensor device is identified as the effective sensor device, an additional audio signal received from the other one of the first sensor device or the second sensor device within a threshold time from when the effective sensor device is identified.

According to the various embodiments of the disclosure described above, the electronic apparatus may prioritize one of a plurality of sensor devices to prevent problems such as duplication of processing, and a waste of resources.

Although the case where the electronic apparatus uses an audio signal to identify the effective sensor device has been described above, the disclosure is not limited thereto. For example, each of the plurality of sensor devices may include a plurality of microphones, and in this case, each of the plurality of sensor devices may identify a direction toward a location of the user uttering user speech. The plurality of sensor devices may transmit the direction toward the location of the user to the electronic apparatus, and the electronic apparatus may identify the effective sensor device based on the direction toward the location of the user.

In the case of using at least two microphones, the direction toward the location of the user may be identified based on the user speech, and a phase difference and a wavelength of the user speech may be acquired through the two microphones because the user speech is physically a sound wave. Further, in the case where the phase difference and the wavelength of the user speech and a distance between the two microphones are used, an angle between a line formed by the two microphones and a line toward the user from the two microphones may be derived by using a trigonometric function formula. With such a method, it is possible to identify the direction toward the location of the user.

Communication between the plurality of sensor devices may also be performed. In this case, audio signals received by the plurality of sensor devices, respectively, may be compared to determine the effective sensor device, and only the effective sensor device may transmit the audio signal to the electronic apparatus. Particularly, each of the plurality of sensor devices may be classified into one of Master Dot or Slave Dot.

In the case where an SNR characteristic before noise reduction and an SNR characteristic after the noise reduction are the same as each other, the processor may identify the effective sensor device based on an intensity of each audio signal, and the like. For example, in the case where the user utters user speech in a living room, a first sensor device located in the living room and a second sensor device located in a kitchen may receive the user speech. Here, in the case where home appliances located in the living room and the kitchen are turned off and separate noise is not generated, an SNR characteristic of an audio signal transmitted from each of the first sensor device and the second sensor device after the noise reduction may be substantially the same as that before the noise reduction. In this case, the processor 120 may identify the effective sensor device based on the intensity of each audio signal.

The processor may also transmit, to the effective sensor device, another message in addition to the notification message notifying a control result. For example, in the case where the user utters "Turn on the air conditioner" and there are a plurality of air conditioners controllable by the processor, the processor may transmit a message requesting specification of an air conditioner to the effective sensor device. Alternatively, the processor may control one of the plurality of air conditioners based on a location of the effective sensor device. Alternatively, the processor may control one of the plurality of air conditioners based on a location of the user. At this time, in the case where the location of the user is continuously changed, another air conditioner rather than an air conditioner located adjacent to the effective sensor device may be operated.

The methods according to the various embodiments of the disclosure described above may be implemented in a form of an application that may be installed in the existing electronic apparatus.

Further, the methods according to the various embodiments of the disclosure described above may be implemented only by performing a software upgrade or a hardware upgrade with respect to the existing electronic apparatus.

Further, the various embodiments of the disclosure described above may be executed through an embedded server provided in the electronic apparatus, or an external server of at least one of the electronic apparatus or the display device.

According to an embodiment of the disclosure, the various embodiments described above may be implemented by software including instructions stored in a machine-readable storage medium (for example, a computer-readable storage medium). A machine may be an apparatus that invokes the stored instruction from the storage medium and may be operated depending on the invoked instruction, and may include the electronic apparatus (for example, the electronic apparatus 100) according to the disclosed embodiments. In the case where an instruction is executed by the processor, the processor may directly perform a function corresponding to the instruction or other components may perform the function corresponding to the instruction under a control of the processor. The instruction may include codes created or executed by a compiler or an interpreter. The machine-readable storage medium may be provided in a form of a non-transitory storage medium. Here, the term "non-transitory" means that the storage medium is tangible without including a signal, and does not distinguish whether data are semi-permanently or temporarily stored on the storage medium.

In addition, according to an embodiment of the disclosure, the methods according to the various embodiments described above may be included and provided in a computer program product. The computer program product may be traded as a product between a seller and a purchaser. The computer program product may be distributed in a form of a storage medium (for example, a compact disc read only memory (CD-ROM)) that may be read by the machine or online through an application store (for example, PlayStore™). In the case of the online distribution, at least portions of the computer program product may be at least temporarily stored in a storage medium such as a memory of a server of a manufacturer, a server of an application store, or a relay server or be temporarily created.

In addition, each of components (for example, modules or programs) according to the various embodiments described above may include a single entity or a plurality of entities, and some of the corresponding sub-components described above may be omitted or other sub-components may be further included in the various embodiments. Alternatively or additionally, some of the components (for example, the modules or the programs) may be integrated into one entity, and may perform functions performed by the respective corresponding components before being integrated in the same or similar manner. Operations performed by the modules, the programs, or other components according to the various embodiments may be executed in a sequential manner, a parallel manner, an iterative manner, or a heuristic manner, at least some of the operations may be performed in a different order or be omitted, or other operations may be added.

Although embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

While the disclosure has been shown described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
a communication interface; and at least one processor configured to:
receive, through the communication interface, a first audio signal and a second audio signal from a first sensor device and a second sensor device, respectively, the second sensor device being located away from the first sensor device,
acquire a similarity between the first audio signal and the second audio signal,
in a case in which the similarity is equal to or higher than a threshold value, acquire a first predicted audio component from the first audio signal based on an operation state of a first electronic apparatus separate from and disposed adjacent to the first sensor device, and a second predicted audio component from the second audio signal based on an operation state of a second electronic apparatus separate from and disposed adjacent to the second sensor device,
based on the first predicted audio component and the second predicted audio component, identify one of the first sensor device or the second sensor device as an effective sensor device, and
perform speech recognition with respect to an additional audio signal received from the effective sensor device.

2. The electronic apparatus of claim 1, further comprising:
a memory storing a mode-specific audio model based on an operation state of the electronic apparatus and at least one other electronic apparatus,
wherein the at least one processor is further configured to:
based on the mode-specific audio model, identify a mode corresponding to the operation state of the first electronic apparatus located adjacent to the first sensor device and the operation state of the second electronic apparatus located adjacent to the second sensor device, and
based on the identified mode, acquire the first predicted audio component and the second predicted audio component from the first audio signal and the second audio signal, respectively, and
wherein the mode-specific audio model is acquired, as each of a plurality of sensor devices learns audio acquired based on an operation state of an adjacent electronic apparatus, through an artificial intelligence algorithm.

3. The electronic apparatus of claim 2, wherein the at least one processor is further configured to:
based on the identified mode, acquire the first predicted audio component and the second predicted audio component from a noise component included in the first audio signal and a noise component included in the second audio signal, respectively,
acquire a first quality characteristic of the first audio signal and a second quality characteristic of the second audio signal based on a magnitude of the first predicted audio component and a magnitude of the second predicted audio component, respectively, and
based on the first quality characteristic and the second quality characteristic, identify one of the first sensor device or the second sensor device as the effective sensor device.

4. The electronic apparatus of claim 3, wherein the first quality characteristic of the first audio signal and the second quality characteristic of the second audio signal each includes at least one of an intensity, a power, or a signal-to-noise ratio (SNR) characteristic of the respective audio signal.

5. The electronic apparatus of claim 2, wherein the at least one processor is further configured to change the operation state of the first electronic apparatus located adjacent to the first sensor device and the operation state of the second electronic apparatus located adjacent to the second sensor device to allow the first electronic apparatus located adjacent to the first sensor device and the second electronic apparatus located adjacent to the second sensor device to be operated in a predetermined mode according to a predetermined event.

6. The electronic apparatus of claim 1, wherein the at least one processor is further configured to:
control at least one of the electronic apparatus or at least one other electronic apparatus based on a speech recognition result, and
control the effective sensor device to provide a notification message notifying a control result.

7. The electronic apparatus of claim 6, wherein the at least one processor is further configured to, in a case in which a user location moves from a vicinity of the effective sensor device to a location of another sensor device, control the other sensor device to provide the notification message notifying the control result.

8. The electronic apparatus of claim 7, wherein the user location is determined based on a signal received from the effective sensor device and a signal received from the other sensor device.

9. The electronic apparatus of claim 1, wherein the at least one processor is further configured to acquire the similarity in a case in which the second audio signal is received within a threshold time from receiving the first audio signal.

10. The electronic apparatus of claim 1, wherein the at least one processor is further configured to:
identify the first sensor device and the second sensor device as a first effective sensor device and a second effective sensor device, respectively, in a case in which the second audio signal is received after a threshold time from receiving the first audio signal, or in a case in which the similarity is lower than the threshold value, and
perform speech recognition with respect to additional audio signals received from the first effective sensor device and the second effective sensor device.

11. The electronic apparatus of claim 1, wherein the at least one processor is further configured to:
acquire a time domain similarity between the first audio signal and the second audio signal,
acquire a frequency domain similarity between the first audio signal and the second audio signal, and
acquire the similarity based on at least one of the time domain similarity or the frequency domain similarity.

12. The electronic apparatus of claim 1, wherein the at least one processor is further configured to, based on one of the first sensor device or the second sensor device being identified as the effective sensor device, ignore an additional audio signal received from one of the first sensor device or the second sensor device within a threshold time from identifying the effective sensor device.

13. The electronic apparatus of claim 1, wherein the at least one processor is further configured to identify the effective sensor device by performing a comparison only with respect to part of the first audio signal and part of the second audio signal that are received, the part of the first audio signal and the part of the second audio signal being determined based on a predetermined time.

14. The electronic apparatus of claim 1, wherein the at least one processor is further configured to, in response to identifying the effective sensor device, transmit, to the effective sensor device, a signal for the effective sensor device to provide an alarm notifying a user that it is the effective sensor device.

15. The electronic apparatus of claim 1,
wherein the first sensor device and the second sensor device comprise a first dot device and a second dot device, respectively,
wherein the first electronic apparatus comprises a first home appliance, and
wherein the second electronic apparatus comprises a second home appliance different from the first home appliance.

16. The electronic apparatus of claim 1,
wherein the operation state of the first electronic apparatus comprises one of a turned-on state, a turned-off state, or a sub-divided operation state of the first electronic apparatus, and
wherein the operation state of the second electronic apparatus comprises one of a turned-on state, a turned-off state, or a sub-divided operation state of the second electronic apparatus.

17. A control method of an electronic apparatus, the control method comprising:
receiving a first audio signal and a second audio signal from a first sensor device and a second sensor device, respectively, the second sensor device being located away from the first sensor device;
acquiring a similarity between the first audio signal and the second audio signal;
in a case in which the similarity is equal to or higher than a threshold value, acquiring a first predicted audio component from the first audio signal based on an operation state of a first electronic apparatus separate from and disposed adjacent to the first sensor device, and a second predicted audio component from the second audio signal based on an operation state of a second electronic apparatus separate from and disposed adjacent to the second sensor device;
based on the first predicted audio component and the second predicted audio component, identifying one of the first sensor device or the second sensor device as an effective sensor device; and
performing speech recognition with respect to an additional audio signal received from the effective sensor device.

18. The control method of claim 17, further comprising:
storing a mode-specific audio model based on an operation state of the electronic apparatus and at least one other electronic apparatus,
wherein the acquiring of the first predicted audio component and the second predicted audio component comprises:
based on the mode-specific audio model, identifying a mode corresponding to the operation state of the first electronic apparatus located adjacent to the first sensor device and the operation state of the second electronic apparatus located adjacent to the second sensor device; and
based on the identified mode, acquiring the first predicted audio component and the second predicted audio component from the first audio signal and the second audio signal, respectively, and
wherein the mode-specific audio model is acquired, as each of a plurality of sensor devices learns audio acquired based on an operation state of an adjacent electronic apparatus, through an artificial intelligence algorithm.

19. The control method of claim 18,
wherein the acquiring of the first predicted audio component and the second predicted audio component based on the identified mode comprises:
based on the identified mode, acquiring the first predicted audio component and the second predicted audio component from a noise component included in the first audio signal and a noise component included in the second audio signal, respectively; and
acquiring a first quality characteristic of the first audio signal and a second quality characteristic of the second audio signal based on a magnitude of the first predicted audio component and a magnitude of the second predicted audio component, respectively, and
wherein, based on the first quality characteristic and the second quality characteristic, identifying one of the first sensor device or the second sensor device as the effective sensor device.

20. An electronic apparatus comprising:
a microphone;
a communication interface; and
at least one processor configured to:
receive a first audio signal through the microphone,
receive a second audio signal from a sensor device through the communication interface,
acquire a similarity between the first audio signal and the second audio signal,
in a case in which the similarity is equal to or higher than a threshold value, acquire a first predicted audio component and a second predicted audio component from the first audio signal and the second audio signal, respectively, based on an operation state of the electronic apparatus and an operation state of another electronic apparatus, the electronic apparatus and the other electronic apparatus being separate from and disposed adjacent to the sensor device,
based on the first predicted audio component and the second predicted audio component, identify one of the electronic apparatus or the sensor device as an effective device, and
perform speech recognition with respect to an additional audio signal received from the effective device.

* * * * *